(12) United States Patent
Yang et al.

(10) Patent No.: US 12,153,688 B2
(45) Date of Patent: Nov. 26, 2024

(54) COMPREHENSIVELY OBFUSCATED CRYPTOGRAPHIC ACCELERATORS AND OPERATIONS THEREOF

(71) Applicant: NVIDIA Corporation, Santa Clara, CA (US)

(72) Inventors: Kun Yang, San Jose, CA (US); Zhili Wang, Henan (CN); Xinxing Hu, Shanghai (CN)

(73) Assignee: NVIDIA Corporation, Santa Clara, CA (US)

( * ) Notice: Subject to any disclaimer, the term of this patent is extended or adjusted under 35 U.S.C. 154(b) by 304 days.

(21) Appl. No.: 17/632,375

(22) PCT Filed: Mar. 29, 2021

(86) PCT No.: PCT/CN2021/083684
§ 371 (c)(1),
(2) Date: Feb. 3, 2022

(87) PCT Pub. No.: WO2022/204898
PCT Pub. Date: Oct. 6, 2022

(65) Prior Publication Data
US 2023/0259638 A1   Aug. 17, 2023

(51) Int. Cl.
*G06F 21/60* (2013.01)
*G06F 21/75* (2013.01)
(52) U.S. Cl.
CPC .......... *G06F 21/602* (2013.01); *G06F 21/755* (2017.08)

(58) Field of Classification Search
CPC ...... G06F 21/602; G06F 21/755; G06F 21/72; H04L 9/085; H04L 2209/125
See application file for complete search history.

(56) References Cited

U.S. PATENT DOCUMENTS

| | | | |
|---|---|---|---|
| 2016/0277179 A1* | 9/2016 | Tunstall | G06F 21/755 |
| 2017/0366340 A1* | 12/2017 | Wyseur | G06F 21/602 |
| 2018/0137512 A1* | 5/2018 | Georgiadis | H04L 63/08 |
| 2020/0110906 A1* | 4/2020 | Choi | H04L 9/06 |
| 2020/0169401 A1* | 5/2020 | Dooley | H04L 9/0822 |
| 2022/0173898 A1* | 6/2022 | Wang | H04L 9/085 |

FOREIGN PATENT DOCUMENTS

| | | | | |
|---|---|---|---|---|
| EP | 2720402 A1 * | 4/2014 | | G09C 1/00 |
| EP | 2720402 B1 | 4/2020 | | |

OTHER PUBLICATIONS

International Search Report and Written Opinion mailed on Nov. 8, 2021, on application No. PCT/CN2021/083684, 19 pages.
Cnuddle, T. et al., "Masking AES with d + 1 Shares in Hardware", International Association of Cryptographic Research, 2016, pp. 194-212.

* cited by examiner

Primary Examiner — Khoi V Le
(74) Attorney, Agent, or Firm — Lowenstein Sandler LLP

(57) ABSTRACT

Apparatuses, systems, and techniques to perform a cryptographic operation using multiple iterations, wherein each iteration includes two or more stages operating in parallel on inputs derived from a common value, one of the stages computing real data and other stages computing dummy data.

19 Claims, 13 Drawing Sheets

COMPREHENSIVELY OBFUSCATED CRYPTOGRAPHIC ACCELERATORS AND OPERATIONS THEREOF

TECHNICAL FIELD

At least one embodiment pertains to processing resources used to perform and facilitate cryptographic applications. For example, at least one embodiment pertains to cryptographic accelerators having enhanced protection against differential power analysis employed by side-channel attackers. Cryptographic systems and methods, according to various novel techniques described herein, deploy obfuscated handling of confidential information that reduces a likelihood of a successful adversarial attack.

BACKGROUND

A side-channel attack attempts to extract secret data from a computing device or some of its hardware components, such as a processor, a memory device, a bus that carries electric signals, and the like. For example, timing sequences of computational operations gleaned from the accompanying electric, magnetic, electromagnetic signals produced by various electronic components can be intercepted (or tapped into) and used to access secret information. Analysis of such signals, e.g., simple power analysis (SPA) or differential power analysis (DPA) can help the attacker to correlate measured device activity (e.g., power consumption, timing) with computations performed by the electronic devices. This can reveal secret cryptographic keys, encrypted messages, and other confidential information. To defend against side-channel attacks, intermediate results of computations can be masked using blinding and randomization techniques, varying processor clock frequency, modifying computational algorithms, and so on. As defensive countermeasures increase in sophistication, so do the attacking techniques, resulting in a demand for new and increasingly more secure cryptographic devices and applications.

BRIEF DESCRIPTION OF DRAWINGS

FIG. 1A illustrates actions and data flows associated with hiding of secret information when a random selector bit has a first value. FIG. 1B illustrates actions and data flows associated with hiding of secret information when a random selector bit has a second value;

DETAILED DESCRIPTION

Figure 1A:
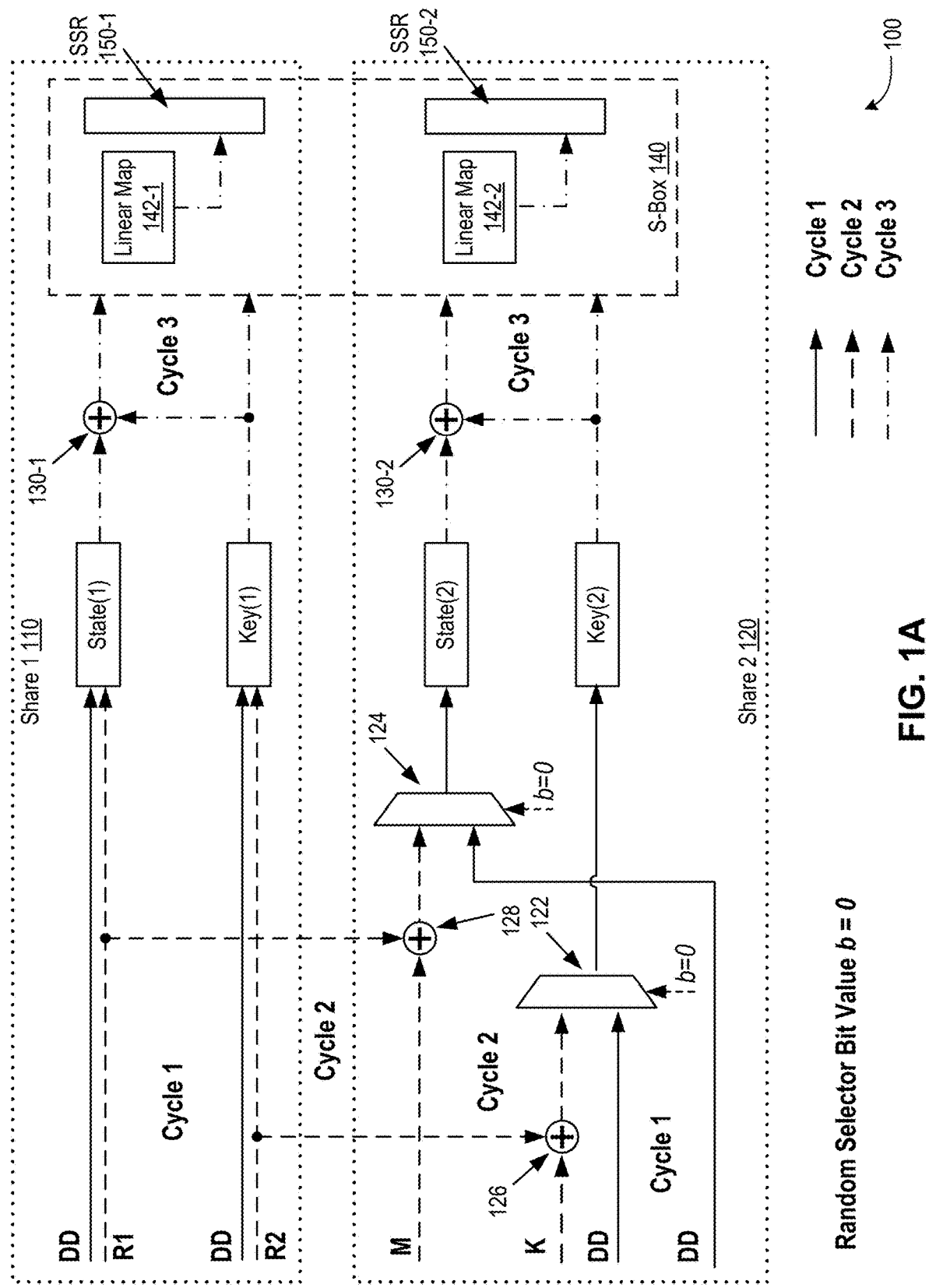
FIGS. 1A-B illustrate actions and data flows associated with hiding of secret information as part of comprehensive obfuscation of cryptographic operations, in accordance with at least some embodiments.

Various encryption standards, such as the 56-bit key Data Encryption Standard (DES) and the 128-bit, 192-bit, or 256-bit Advanced Encryption Standard (AES) have been commonly used to protect secret data (encryption keys, digital signatures, confidential information, and the like). While properly designed AES algorithms provide strong protection against brute-force (trial-and-error) attacks and related-key attacks, key-distinguishing attacks, key-recovery attacks, etc., secret data can still be vulnerable to a well-executed side-channel attack that uses data inadvertently leaked by various hardware devices, such as Central Processing Units (CPUs), cache memory, random-access memory (RAM), buses, and the like. Leaked information may be contained in the timing of computational operations being performed, the intensity of computational operations (expressed via absolute and differential power consumed), and so on. Modem CPUs are often designed with built-in hardware instructions for AES to protect against some (e.g. timing-related) attacks. For example, some CPUs may be asynchronous CPUs lacking a global timing sequence. To prevent correlation attacks employing statistical analysis, various blinding techniques may be used, e.g., mixing up random numbers into the calculations in a controlled way that does not affect the outcome of the computations (with the introduced random values eventually removed or canceled out in some way). More sophisticated masking countermeasures may include splitting a secret number y into multiple shares $y=y_1 \oplus y_2 \oplus \ldots$ that add up (e.g., by means of an XOR operation $\oplus$) to the actual number y. As shares $y_1, y_2 \ldots$ are processed independently, an attacker is faced with a challenging task to determine all shares before the actual number y of interest to the attacker can be recovered. Nonetheless, a committed attacker having access to large ensembles of power consumption data can eventually succeed (e.g., using higher-order DPA correlations) and gain access to a secret key and/or other data. In some instances, a cryptographic system can be particularly vulnerable to side-channel attacks during a specific period of its operations, e.g., at the beginning phases of operations, before a secret key is masked or otherwise obfuscated.

Aspects and embodiments of the present disclosure address these and other limitations of the present technology by enabling comprehensive obfuscation of cryptographic operations at multiple phases of computations. The disclosed techniques reduce the time (and/or the number of clock cycles) when the secret information remains unprotected (not yet obfuscated) within a computing system as well as minimize the number of operations that are performed with unprotected information. For the sake of conciseness, embodiments are illustrated herein using AES systems and methods as an illustrative example, but other cryptographic systems, methods, and applications can be similarly improved with the techniques described herein.

As an illustrative example, AES may involve several linear and non-linear stages of manipulations of an input cryptographic key and a message to be encrypted (e.g., plaintext) or decrypted (ciphertext). At first, an initial key may be expanded up to a round key of a target size (e.g., 128 bits) using a key schedule. The obtained round key may be used for a given round of transformations of the input message (or a fixed-size portion of the message, e.g., a 128-bit portion) and may then be replaced with a different key for a subsequent round. The number of rounds (e.g., 10, 12, or 14) may depend on the key size (for 128-bit, 192-bit, and 256-bit keys, respectively). Each round may involve a non-linear mapping of the input state onto a different—mapped—state. A state may refer to a 16-byte (128-bit) array of data, which may be referenced as a 4×4 matrix of one-byte elements. The mapping is also often referred to as a substitution stage, "SubBytes," or a substitution box (S-Box). S-Box may be an 8-bit box whose operations may be based on finite Galois fields, $GF(2^8)$. The inverse of S-Box transformations may be used during decryption operations from the ciphertext to back to the plaintext. The S-Box is a non-linear mapping in the sense that a sum of two numbers A+B is not mapped to a sum of separate mappings of number A and number B (e.g., Map(A+B)≠Map(A)+Map(B)) and that the mapping of a scaled number, cA, is not mapped to the scaled mapping of number A (e.g., Map(c·A) ≠c·Map(A)). Prior to the execution of the S-Box stage, a round key may be combined (e.g., using a bitwise XOR addition) with the plaintext message (operation "AddRoundKey"). Following the S-Box, a number of other (linear) transformations may also be performed on the resulting 4×4 matrix, such as shifting cyclically various rows of the mapped matrix a certain number of row-specific steps (operation "ShiftRows"), multiplying the result by a fixed matrix (operation "MixCoumns"), generating and adding another round key, etc. After repeating such operations a target number of times, a ciphertext is ultimately produced. Similar operations may then be performed to recover the plaintext message from the ciphertext.

Architecture and Operations of Cryptographic Accelerators

Figure 1B:
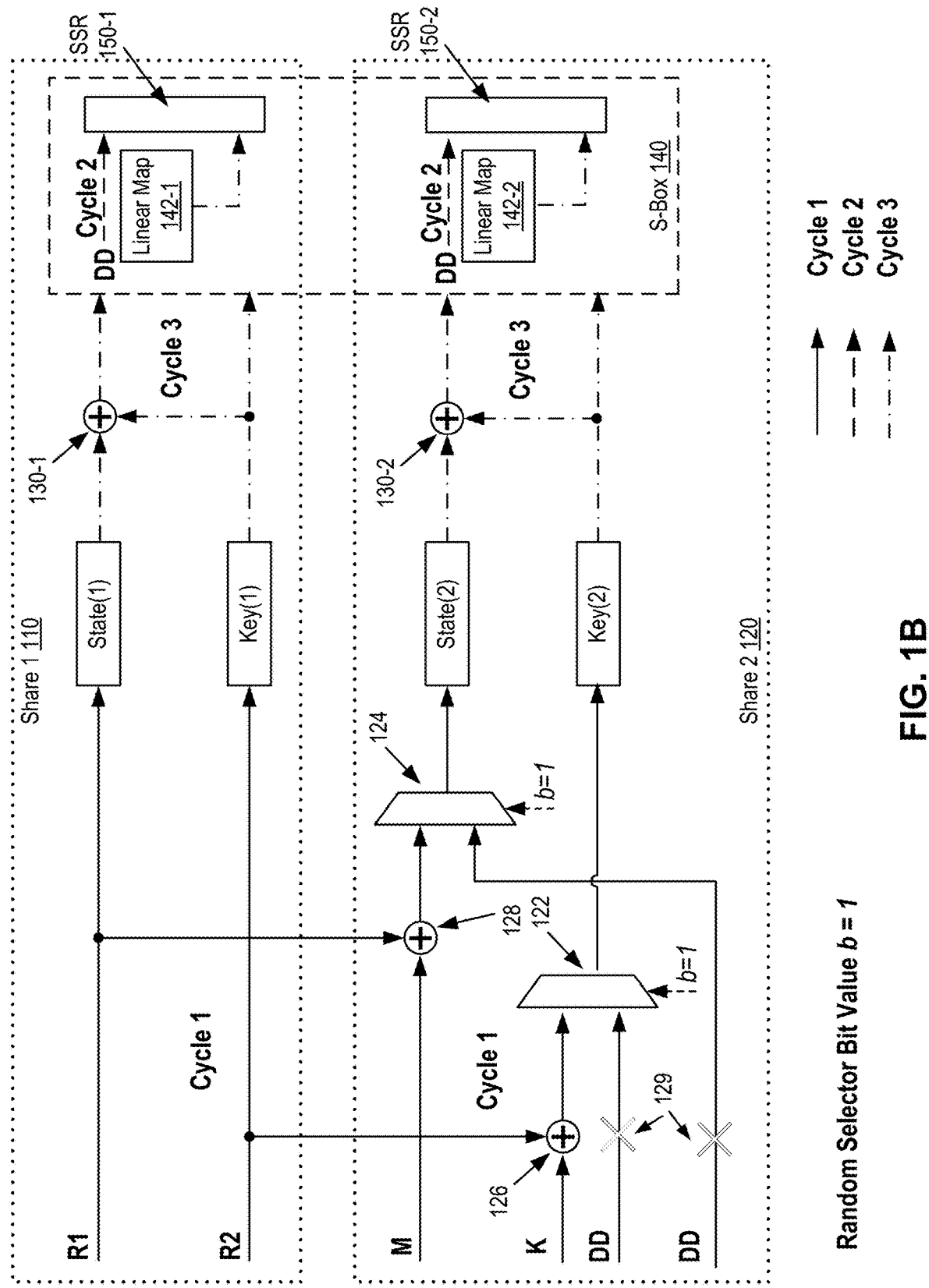

FIGS. 1A-B illustrate actions and data flows associated with hiding of secret information as part of comprehensive obfuscation of cryptographic operations, in accordance with at least some embodiments. Actions and data flows depicted in FIGS. 1A-B may enable hiding of real data (such as an actual message being encrypted, initial key, round keys, and so on) among sets of dummy data. Dummy data may refer to any appropriate data (e.g., randomly generated data) whose specific values do not affect the ultimate outcome (e.g., the value of the ciphertext) of the operations being performed but decrease a signal-to-noise ratio, mix computational sequences, an order of store/read operations, introduce inconsequential arithmetic operations (e.g., addition, multiplication, reduction or division, and so on), or otherwise obfuscate actual computations carried out by the computing system. Obfuscating countermeasures illustrated in FIGS. 1A-B protect secret information from very early stages of the computations and make it more difficult for an attacker to exploit potential exposure of the confidential information, unlike conventional measures that do not provide a similar level of protection.

In some embodiments, an output of a cryptographic operation may be computed using multiple shares. In particular, a plaintext message M may be represented as the sum M=R1+(M−R1) of any appropriate number R1 (which can be a randomly generated number) and the number M−R1 (which is based on the actual message M and the number R1). While the addition may be a conventional arithmetic addition, in AES algorithms a bitwise XOR addition ⊕ is often used instead. XOR addition is an addition modulo 2 and produces value 1 when the arithmetic sum of the two numbers being added is equal to 1 and produces value 0 whenever arithmetic sum is 0 (0⊕0=0) or 2 (meaning that 1⊕1=0) because 2=0 mod 2. As a result, bitwise subtraction and bitwise addition have the same outputs. Accordingly, an input message may be split as M=R1⊕(M⊕R1) into two shares, R1 and M⊕R1. Likewise, a key (initial key or a round key) may be split into its own respective shares, K=R2⊕(K⊕R2) using a different (e.g., random) number R2. While for brevity and ease of viewing, FIGS. 1A-B depict an example embodiment of two shares, any appropriate number n of shares may be used. In such embodiments, n−1 random numbers may be used to obfuscate message M (and, similarly, key K):

$$M = R1 \oplus R2 \oplus R3 \oplus \ldots \oplus (M \oplus R1 \oplus R2 \oplus R3 \oplus \ldots).$$

In some embodiments, in addition to randomly selected numbers R1, R2, etc., additional dummy numbers may be generated and used for hiding of the actual inputs (e.g., M and K). Dummy numbers and dummy inputs are indicated in FIGS. 1A-B as dummy data (DD). Even though the same notation DD is used in multiple instances, it should be understood that various instances of dummy data may represent different numbers. By nature, dummy data are inconsequential and can be replaced with any other appropriate data without affecting the ultimate outcome of the cryptographic operation. In some embodiments, dummy data may be selected uniformly (e.g., randomly) to maximize noise and minimize the ability of an attacker to identify operations performed on real data and distinguish such operations from operations performed on dummy data.

Generation of random numbers (R1, R2, DD, input selector signals, etc.) may be performed using any appropriate known methods and systems, such as any algorithmic pseudorandom number generators, hardware (true) random number generators, or the like.

Hiding real data among sets of dummy data may be performed using random selectors (selector signals). In embodiments where cryptographic inputs are divided into two shares, a random selector may be a random bit b that takes two values, e.g., 0 and 1, with equal probabilities. Random selector bit b taking a specific value may determine a sequence of operations to be performed prior to operations of S-box 140. FIG. 1A illustrates actions and data flows associated with hiding of secret information when a random selector bit has a first value, e.g., b=0. Responsive to a random number generator generating value b=0, a processing device (e.g., a cryptographic accelerator, a dedicated circuit, a CPU, a graphics processing unit (GPU), a field programmable gate array (FPGA), an application-specific integrated circuit (ASIC), or any appropriate combination thereof) may determine that real data is not to be stored in registers (e.g., state register, key register, etc.) during a first clock cycle (cycle 1) of the processing device and are to be stored during a second clock cycle (cycle 2) of the processing device. Responsive to determining that b=0, at cycle 1 (cf. data flows indicated in FIG. 1A with solid arrows), the processing device may store DD in state register of share 1 (110), State(1), key register of share 1, Key(1), in state register of share 2 (120), State(2), and key register of share 2, Key(2). As depicted in FIG. 1A, the random bit value may be input as a selection signal into multiplexers 122 and 124 that pass DD to State(2) and Key(2). Specific values of DD do not affect the output of the computations since data stored during cycle 1 are to be overwritten during the next clock cycle 2.

More specifically, at cycle 2, random numbers R1 and R2 may be generated and stored as shown by dashed arrows in conjunction with message M and cryptographic key K. Unlike DD stored during cycle 1, numbers R1, R2, M, and K represent real (though obfuscated) data. In one embodiment, random numbers R1 and R2 are stored in State(1) and Key(1) registers of share 1, respectively. Copies of numbers R1 and R2 may also be provided to circuits that perform operations of share 2 and may be added (e.g., using gates 126 and 128 performing bitwise XOR operations) to M and K, respectively, to obfuscate message M and cryptographic key K. The value of the random bit provided in the form of the selection signals into multiplexers 122 and 124 may be inverted (flipped) during cycle 2 (e.g., b=1). Responsive to the inverted selection signals b=1 (not depicted explicitly), multiplexers 122 and 124 may pass signals corresponding to numbers M⊕R1 and K⊕R2 that are thus stored in State(2) and Key(2) registers of share 2 (overwriting DD previously stored during cycle 1).

During cycle 3 (cf. dot-dashed lines), values stored in State(1) and Key(1) registers may be added using bitwise XOR gates 130-1 and 130-2 ("AddRoundKey" operation) and provided to S-box 140 for additional processing as described in more detail below. Depicted schematically is a first stage of S-box 140, which may include linear mapping 142-1 of share 1 and linear mapping 142-2 of share 2. Outputs of linear mappings 142-1 and 142-2 may be stored in respective S-box stage status registers (SSR) 150-1 and 150-2, from where the outputs may then be read as inputs into subsequent operations of S-box 140, as described in more detail below.

FIG. 1B illustrates actions and data flows associated with hiding of secret information when a random selector bit has a second value, e.g., b=1. Responsive to the random number generator generating value b=1, the processing device may determine that real data is to be stored during cycle 1 of the processing device and DD is to be stored during cycle 2 of the processing device. Responsive to determining that b=1, at cycle 1 (data flows indicated with solid arrows), the processing device may generate random numbers R1 and R2, use them to obfuscate message M and key K. and store the results, substantially as done in cycle 1 of FIG. 1A. Specifically, random numbers R1 and R2 may be stored in State(1) and Key(1) registers of share 1. Copies of numbers R1 and R2 may be added, by bitwise XOR gates 126 and 128, to M and K, respectively, to obfuscate message M and key K. As indicated with crosses 129. DD signals may be blocked by multiplexers 122 and 124 (receiving selection values b=1). Multiplexers 122 and 124 may pass signals corresponding to numbers M⊕R1 and K⊕R2 that are stored in State(2) and Key(2) registers of share 2 (overwriting data stored therein during previous operations).

During cycle 2, since real data is already stored in registers State(1), Key(1), State(2), and Key(2), the processing device may store (as depicted with dashed arrows within S-Box 140) dummy data in a portion (SSR 150-1 or SSR 150-2) of the stage status register. For example, an n-th byte of share 1 and an n-th byte of share 2 may be stored in different portions of the same stage status register. Storage of the dummy data introduces additional noise and makes it more difficult to a potential attacker to collect meaningful statistical data.

Operations of cycle 3 (dot-dashed lines) may be performed substantially as operations of cycle 3 depicted in FIG. 1A. Values stored in State(1) and Key(1) registers may be added using bitwise XOR gates 130-1 and 130-2 ("AddRoundKey" operation) and provided to S-box 140 for additional processing as described in more detail below. Outputs of linear mapping stages 142-1 and 142-2 may be stored in respective portions SSR 150-1 and SSR 150-2 of the stage status register overwriting dummy data previously stored therein during cycle 2.

Figure 2:
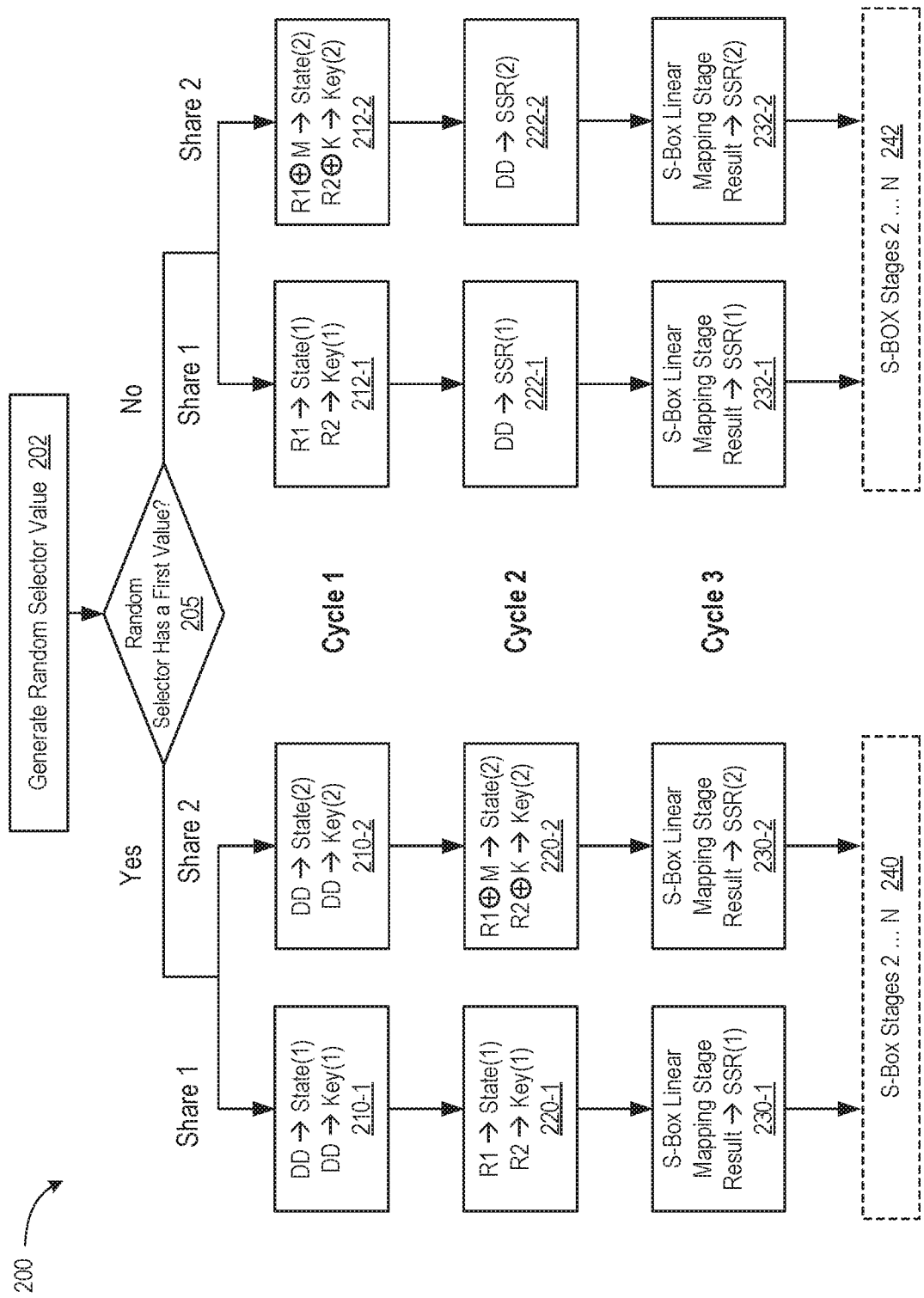
FIG. 2 is a flow diagram illustrating an example hiding of secret information as part of comprehensive obfuscation of cryptographic operations, in accordance with at least some embodiments.

FIG. 2 is a flow diagram illustrating an example hiding 200 of secret information as part of comprehensive obfuscation of cryptographic operations, in accordance with at least some embodiments. Blocks of example hiding 200 correspond to various operations described above in conjunction with FIGS. 1A-B. Blocks of example hiding 200 will be described below as performed by a cryptographic accelerator co-processor (CAC) but it should be understood that similar operations may be performed by a CPU, FPGA, GPU, application-specific logic circuit, or some other processing device. At block 202, CAC may generate a random selector value. In some embodiments, the random selector value may be generated by a random number generator of CAC. In some embodiments, the random selector value may be generated by a random number generator that is external to CAC. At block 205, CAC may determine (e.g., using one or more multiplexers) whether the random selector has a first value (e.g., 0 or 1) or a second value (e.g., 1 or 0). In the embodiment depicted in FIG. 2, which uses two shares of secret numbers, the random selector may be a single bit that takes one of two values. Alternatively, any appropriate random number generator may be used, e.g., a generator that randomly generates numbers from 0 to N−1, with the first half (from 0 to N/2−1) of the numbers corresponding to a first random selector value and the second half (from N/2 to N−1) of the numbers corresponding to a second selector value (or, alternatively, even numbers corresponding to the first random selector value and odd numbers corresponding to the second random selector value).

Blocks 210 and 212 correspond to operations performed by CAC during cycle 1. If the random selector has the first value, blocks 210-1 and 210-2 are performed for share 1 and share 2, respectively, with CAC writing dummy data into both state registers and both key registers. If the random selector has the second value, blocks 212-1 and 212-2 are performed for share 1 and share 2, respectively, with CAC writing real data into both state registers and both key registers, as shown in FIG. 2.

Blocks 220 and 222 correspond to operations performed by CAC during cycle 2. If the random selector had the first value, blocks 220-1 and 220-2 are performed for share 1 and share 2, respectively, with CAC writing real data into both state registers and both key registers. If the random selector had the second value, blocks 222-1 and 222-2 are performed for share 1 and share 2, respectively, with CAC writing dummy data into the stage status register.

Blocks 230 and 232 correspond to operations of a first stage (linear mapping) of S-Box performed by CAC during cycle 3. In both instances—of the first random selector value and the second random selector value—CAC operates with real data stored in state and key registers of the respective shares. For example, at blocks 230-1 and 232-1. CAC inputs R2 and R1⊕R2 into S-Box linear mapping Stage of share 1, and in blocks 230-2 and 232-2. CAC inputs (K⊕R2) and (M⊕R1)⊕(K⊕R2) into S-Box linear mapping Stage of share 2. Outputs of linear mapping stages may subsequently be processed by other (e.g., second, third . . . etc.) stages of CAC as depicted schematically with dashed boxes 240 and 242. Because S-Boxes 140 perform non-linear transformations, different shares may be processed by the same S-Box. In some embodiments, each stage of an S-Box may be a separate circuit. In some embodiments, multiple (or all stages) of S-Box may be combined into a single integrated circuit (e.g., implemented on a single chip or die). In some embodiments, the combined integrated circuit may be integrated with another processing device (e.g., a CPU).

Although FIGS. 1A-B and FIG. 2 depict two shares, a larger number of shares may be used. In one non-limiting embodiment, m shares may be used. Additionally, storing state and key data may be spread over n clock cycles (rather than over n=2 cycles as in the aforementioned example). A random selector may be a random number generator capable of generating at least n different values identifying a clock cycle when the actual data is to be stored in state and key registers. For example, if the random selector value is determined to be n' (n'≤n), loading data into the registers may be performed as follows. (1) during the first n'−1 cycles, dummy data is stored in the state and key registers (with previously written dummy data being overwritten with a new dummy data at each cycle), (2) during the n'-th cycle, real data is stored in all shares; and (3) during the last n−n' cycles, dummy data is stored in stage status registers of all shares. In other embodiments, data in each of the m shares may be stored independently from other shares with m random selectors (each capable of taking n different values) determining an order in which data is to be stored in different shares. For example, it may be determined based on the random selector values that real data in share 1 are to be stored in State(1) and Key(1) during cycle 6 (out of total 8 cycles) whereas real data in share 4 is to be stored in State(4) and Key(4) during cycle 3. Accordingly, cycles 1 through 5 may be used to store dummy data in registers State(1) and Key(1) with new data overwriting previous data in the same registers, while during cycles 7 and 8 dummy data is stored in SSR(6). Similarly, cycles 1 and 2 may be used to store dummy data in registers State(4) and Key(4), while during cycles 4 through 8 dummy data is stored in SSR(4).

Figure 3A:
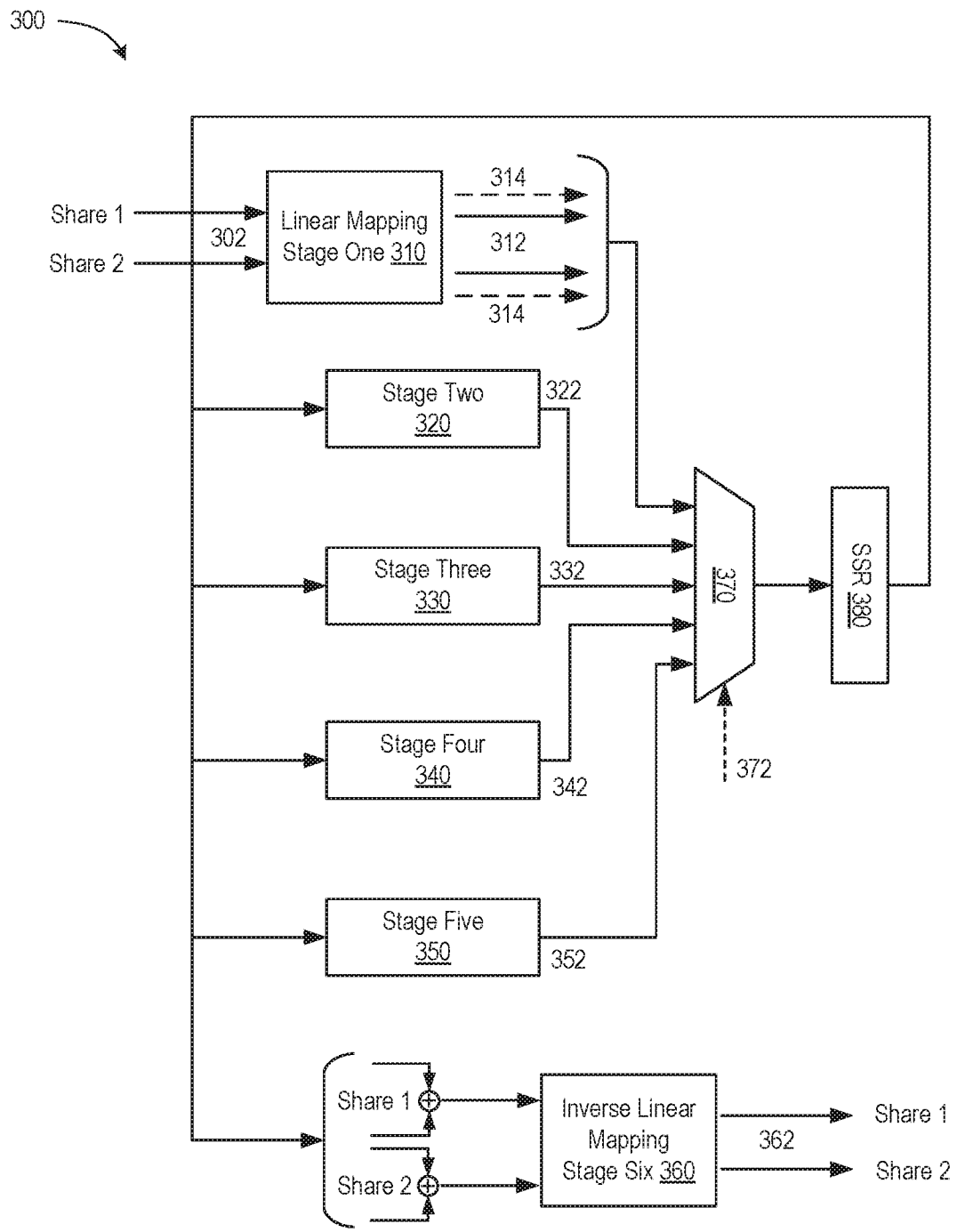
FIG. 3A illustrates an architecture of a substitution box capable of performing masking of secret information as part of comprehensive obfuscation of cryptographic operations, in accordance with at least some embodiments.

FIG. 3A illustrates an architecture of a substitution box 300 capable of performing masking of secret information as part of comprehensive obfuscation of cryptographic operations, in accordance with at least some embodiments. S-Box 300 may be implemented via a number of stages, each stage including one or more circuits, such as logic gates, gate arrays, transistor arrays, or other logic circuits. S-Box 300 may process an input data that is the result of hiding operations depicted in conjunction with FIGS. 1A-B and FIG. 2. For example, S-Box 300 may perform non-linear mapping of a first representation of the input data to a second representation of the input data. The first representation may be representative of the input message into the cryptographic operation M and the cryptographic key K but may be different from M and K as a result of randomization (e.g., using XOR additions) of M and K with random numbers R1 and R2. The cryptographic operation M and the cryptographic key K may be recoverable from the first representation (e.g., using further XOR additions). Likewise, the first representation may be recoverable from the second representation, e.g., by applying an inverse S-Box to the second representation.

Shown in FIG. 3A is an example S-Box 300 having six stages 310-360 although the embodiments disclosed herein may apply to S-boxes with any appropriate number of stages. Stages 310-360 may be applied to the (obfuscated) shares of input secret information described in conjunction with FIGS. 1A-B and FIG. 2. In some implementations, multiple (e.g., sixteen) S-boxes may be concurrently processing multiple bytes of share 1 and multiple bytes of share 2. For example, stages 310-360 may be processing concurrently a certain number of bytes (e.g., one, two, etc.) of share 1 and the same number of bytes of share 2 (e.g., bytes of share 1 that are in the same positions as bytes of share 2). Stage One 310 may be linear mapping stage 142 of FIGS. 1A-B and/or linear mapping stage of boxes 230 and 232 of FIG. 2. Because S-Box 300 implements non-linear operations (unlike other operations of AES algorithms), all shares may be processed together, whereas linear operations, such as ShiftRows, MixColumns, etc., may be performed separately on each share. In a two-share embodiment, an input 302 into S-Box 300 may, therefore, include data for both shares. In some implementations, multiple (e.g., sixteen) S-boxes may be processing 128 bits of a 4×4 array of bytes of State, with each S-Box processing 8 bits of the State, e.g., with the respective S-Box's stage status register receiving 8 bits of share 1 and 8 bits of share 2 of State (for the total of 16 bits of input 302 into a given S-Box). Additional S-boxes (e.g., four additional S-Boxes may be used for other operating (e.g., as part of a KeyExpansion module). In some embodiments, Stage One 310 may map every 8-bit portion of input 302 (that is split into 8 bits of share 1 and 8 bits of share 2), to an 8-bit output portion 312 using a number of logic gates (e.g. XOR gates) and connectors (not shown explicitly). In some embodiments, various bits of the output portion of Stage One 310 may be an XOR-sum of one or more input bits of the respective input portion.

The output of Stage One 310 may be input into multiplexer 370 whose output may be controlled by selection signal 372. Selection signal 372 provided to multiplexer 370 may be of such a value that the output 312 of Stage One 310 passes on to a stage status register 380. In some embodiments, stage status register 380 may be a 32-bit register, but stage status registers of any other appropriate size may also be used (the size may depend on the number of shares). Since output 312 of Stage One 310 may have fewer than 32 bits (e.g., 16 bits, 8 bits per share), additional (masking) random bits 314 may be generated and added to the output 312 of Stage One 310. The number that has been stored in stage status register 380 may then be used as an input into multiple stages of S-Box 300. In some embodiments, as depicted in FIG. 3, the same input may be provided to five stages 320-360.

Figure 3B:
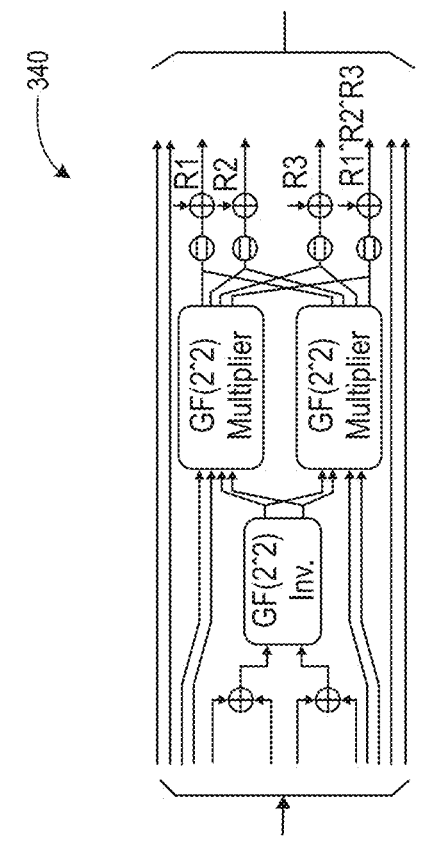
FIG. 3B depicts Stage Two of the substitution box depicted in FIG. 3A.
Figure 3C:
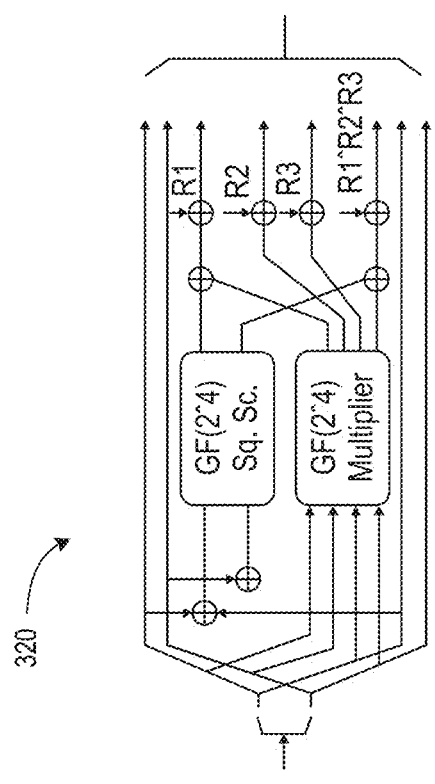
FIG. 3C depicts Stage Three of the substitution box depicted in FIG. 3A.
Figure 3D:
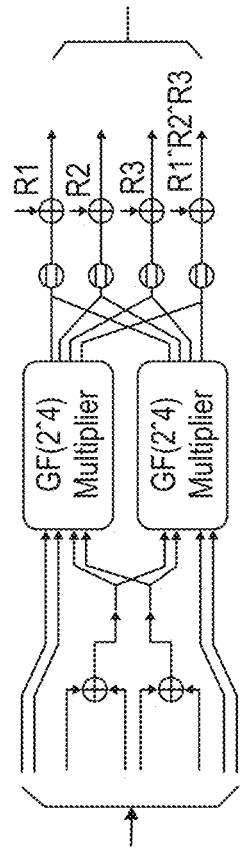
FIG. 3D depicts Stage Four of the substitution box depicted in FIG. 3A.
Figure 3E:
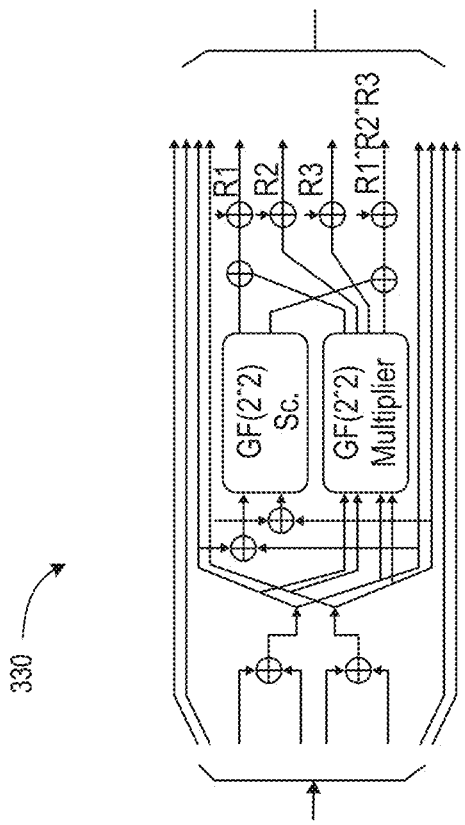
FIG. 3E depicts Stage Five of the substitution box depicted in FIG. 3A.

Stage Six 360 may be an inverse linear mapping stage, which may operate similarly to linear mapping Stage One 310, which is described above. Possible embodiments of stages 320-350 are depicted in FIGS. 3B-E. FIG. 3B depicts Stage Two 320 of substitution box 300. Stage Two 320 may include $GF(2^4)$ multiplication and $GF(2^4)$ affine Square Scaling. FIG. 3C depicts Stage Three 330 of substitution box 300. Stage Three 330 may include $GF(2^2)$ multiplication and $GF(2^2)$ affine Scaling. FIG. 3D depicts Stage Four 340 of substitution box 300. Stage Four 340 may include $GF(2^2)$ inversion and two parallel GF($2^2$) multiplications. FIG. 3E depicts Stage Five 350 of substitution box 300. Stage Five 350 may include two parallel GF($2^4$) multiplications. It should be understood that illustrations depicted in FIGS. 3B-E are example embodiments and numerous other embodiments of S-box 300 or other S-Boxes are possible.

While all five stages 320-360 may receive the same input (from stage status register 380), only one stage performs computations that are of consequence for the output of S-Box 300. The remaining stages perform obfuscating operations that increase noise and make it more difficult for a side-channel attacker to use DPA and statistical analysis to extract secret information. Multiplexer 370 (receiving appropriate selection signals) may control that correct data is stored in stage status register 380 at appropriate times.

In an example illustration, computations performed by S-Box 300 after linear mapping Stage One 310 has processed S-Box input 302 may take five additional iterations. During a first iteration, output 312 of Stage One 310 (possibly augmented with random bits 314 and stored in stage status register 380), may be provided from register 380 to all five remaining stages 320-360. Accordingly, during the first iteration, Stage Two 320 is computing real (consequential) output 322 whereas the remaining stages 330-360 are computing dummy (inconsequential) outputs 332, 342, 352, and 362. Multiplexer 370 is then provided with a selection signal 372 that passes output 322 on to stage status register 380. Additional (not shown) random number inputs into multiplexer 370 may further be provided (but not selected) for additional masking of S-Box operations.

During a second iteration, output 322 of Stage Two 320 (stored in stage status register 380) may be provided from stage status register 380 to all five stages 320-360. Accordingly, during the second iteration. Stage Three 330 is computing real (consequential) output 332 whereas the remaining stages 320 and 340-360 are computing dummy (inconsequential) outputs 322, 342, 352, and 362. Multiplexer 370 is then provided with a new selection signal 372 that passes output 332 on to stage status register 380.

During a third iteration, output 332 of Stage Three 330 (stored in stage status register 380) may be provided from stage status register 380 to all five stages 320-360. Accordingly, during the third iteration, Stage Four 340 is computing real (consequential) output 342 whereas the remaining stages 320-330 and 350-360 are computing dummy (inconsequential) outputs 322, 332, 352, and 362. Multiplexer 370 is then provided with a new selection signal 372 that passes output 342 on to stage status register 380.

During a fourth iteration, output 342 of Stage Four 340 (stored in stage status register 380) may be provided from stage status register 380 to all five stages 320-360. Accordingly, during the fourth iteration, Stage Five 350 is computing real (consequential) output 352 whereas the remaining stages 320-340 and 360 are computing dummy (inconsequential) outputs 322, 332, 342, and 362. Multiplexer 370 is then provided with a new selection signal 372 that passes output 352 on to stage status register 380.

During a fifth iteration, output 352 of Stage Five 350 (stored in stage status register 380) may be provided from stage status register 380 to all five stages 320-360. Accordingly, during the fifth iteration. Stage Six 360 is computing real (consequential) output 362 whereas the remaining stages 320-350 are computing dummy (inconsequential) outputs 322, 332, 342, and 352. The output 362 of Stage Six 360 represents the output of the whole S-Box 300.

As a result of the architecture of S-Box 300 depicted in FIG. 3A, multiple stages of S-Box 300 are receiving (the same) inputs and performing computational operations, but only for one of these stages (being tracked by selection signal 372) the computations performed are real (consequential) computations whereas all other stages are producing noise to obfuscate physical emissions of S-box 300.

Figure 4:
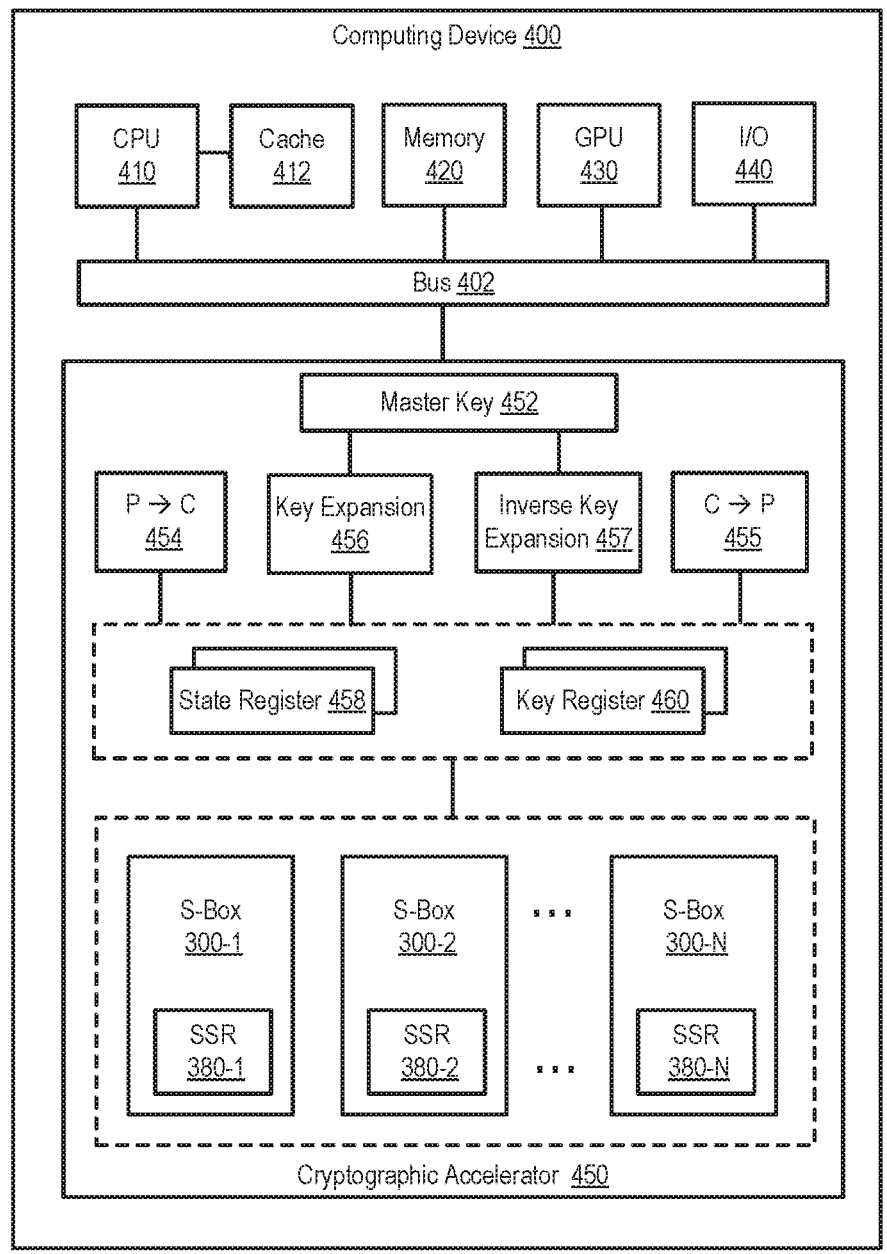
FIG. 4 is an example computing device capable of performing comprehensive obfuscation of cryptographic operations, in accordance with at least some embodiments.

FIG. 4 is an example computing device 400 capable of performing comprehensive obfuscation of cryptographic operations, in accordance with at least some embodiments. In one embodiment, computing device 400 may include (one or more) CPU 410, which may have access to (single-level or multiple-level) cache 412. Computing device 400 may include one or more memory devices 420, which may include read-only memory (ROM), random-access memory (RAM), static RAM, dynamic RAM, or any other appropriate type of memory. Computing device 400 may further include (one or more) GPU 430, which may have multiple cores, each core being capable of executing multiple threads (e.g., concurrently and in parallel). Computing device 400 may further have an input/output (I/O) interface 440 to enable communication (e.g., over a network, serial ports, parallel ports, peripheral component interconnect, and so on) with outside devices, including various peripheral devices. Computing device 400 may include a cryptographic accelerator 450, which may be a cryptographic accelerator circuit, implemented on a separate chip, or integrated with CPU 410 and/or GPU 430 on a single chip. Various components of computing device 400 may communicate via a bus 402. Computing device 400 may be supporting a cryptographic application or any other appropriate application that utilizes cryptographic accelerator 450 for encryption and/or decryption of data.

Cryptographic accelerator 450 may have various modules and components implemented as separate sub-circuits or as parts of the same circuits that provide distinct functionality. While some of the modules and components of cryptographic accelerator 450 are depicted in FIG. 4, it should be understood that cryptographic accelerator 450 may have various additional components that are not depicted explicitly. Cryptographic accelerator 450 may include (one or more) master key(s) 452. Operations of encryption (P→C) module 454 that converts plaintext (P) to ciphertext (C) may be supported by key expansion module 456, which may use master key 452 to derive initial keys and round keys during various rounds of encryption algorithms. Similarly, operations of decryption (C→P) module 455 that converts ciphertext (C) to plaintext (P) may be supported by inverse key expansion module 457. Operations of P→C module 454 (and C→P module 455) may include hiding actual data among randomly generated dummy data, as described above in relation to FIGS. 1A-B and FIG. 2. States and keys of cryptographic operations (e.g., encryption and/or decryption operations) may be stored in a plurality of state registers 458 and key registers 460, respectively. In some embodiments, state registers 458 and key registers 460, which may be 128-bit registers (or registers of some other size) capable of storing 16 bytes of plaintext or ciphertext and 16 bytes of an expanded key.

Cryptographic accelerator 450 may include one or more substitution boxes (S-Boxes) 300-1, 300-2, . . . 300-N. Each of the S-Boxes 300 may have access to a respective stage status register 380-1, 380-2, . . . 380-N for storing intermediate results of computations (performed by various stages) of corresponding S-Boxes 300. In some embodiments, number N of separate S-Boxes 300 may be so chosen that an entire 16-byte plaintext/ciphertext (or 16-byte portion of plaintext/ciphertext) is processed in parallel. For example, sixteen (N=16) S-boxes may be processing 128 bits of a 4×4 array of bytes (the State), with each S-Box processing 8 bits of the State, e.g., with the respective S-Box's stage status register receiving 8 bits of share 1 and 8 bits of share 2 of the State (for the total of 16 bits of input 302 into a given S-Box). Four additional S-boxes may be used for KeyExpansion operations. Accordingly, some cryptographic accelerator co-processors may include 20 of S-Boxes. Other implementations may have a different number of S-Boxes.

Figure 5:
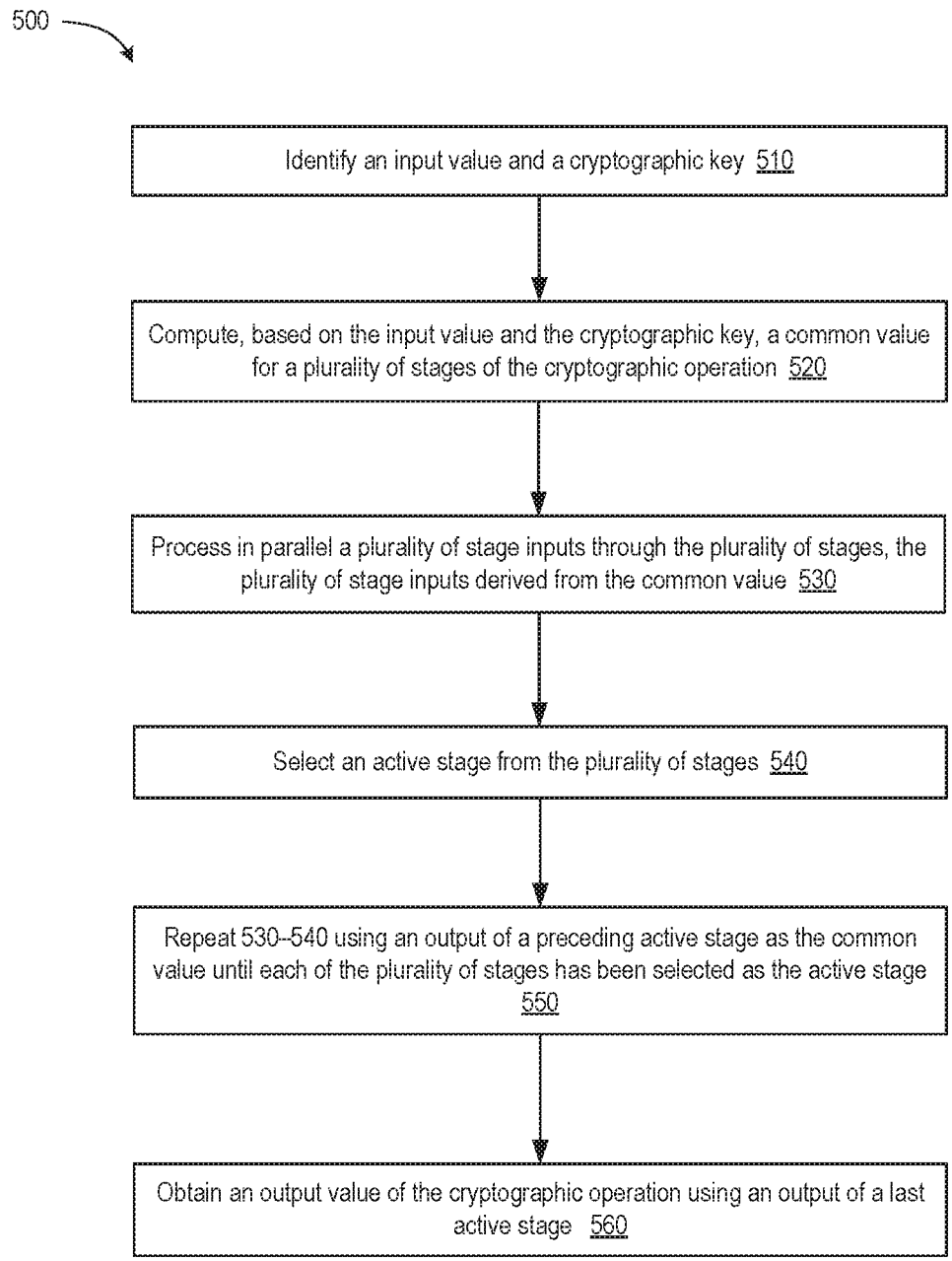
FIG. 5 is a flow diagram of an example method of comprehensive obfuscation of cryptographic operations, in accordance with at least some embodiments.
Figure 6:
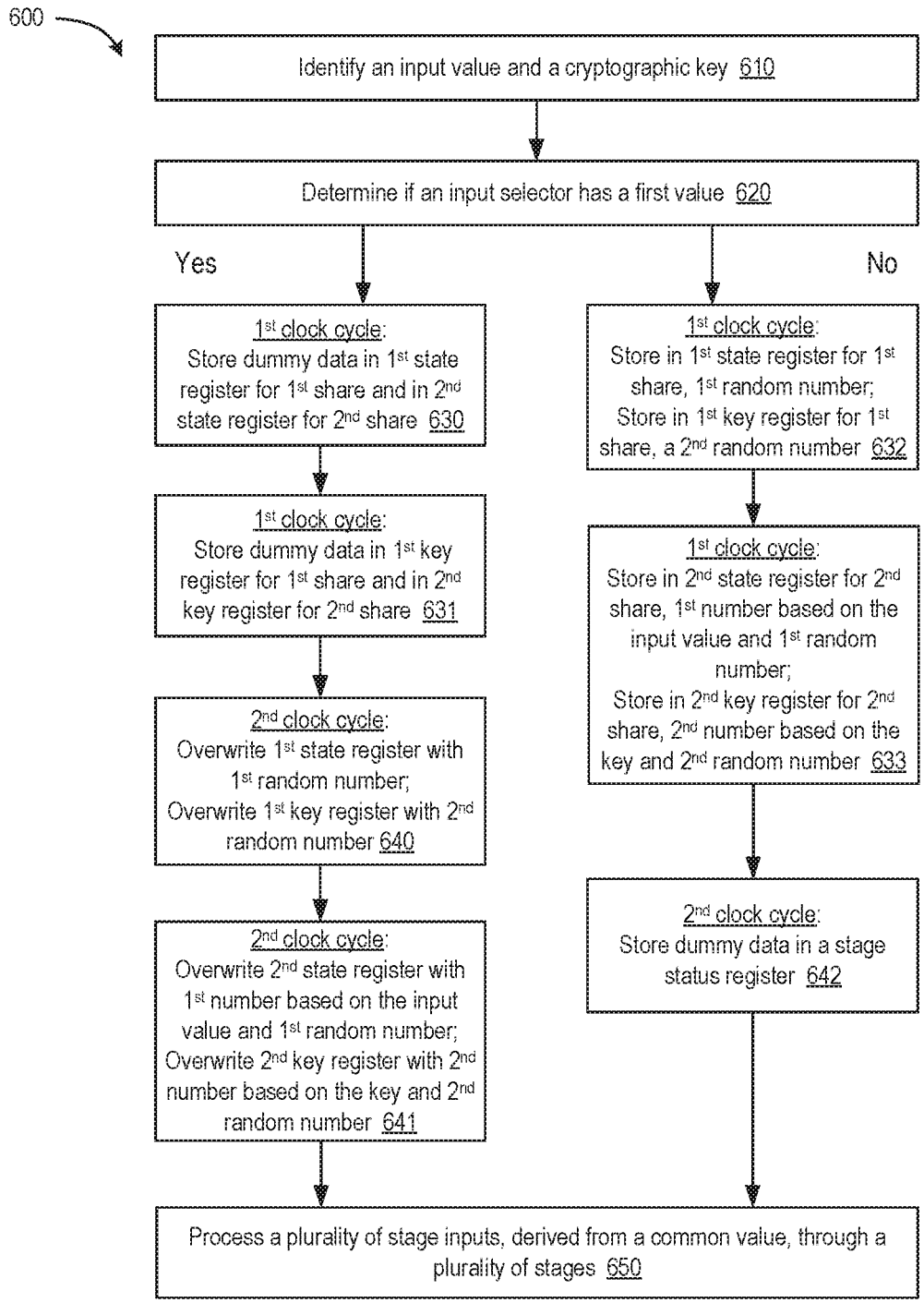
FIG. 6 is a flow diagram of an example method 600 of hiding of secret information as part of comprehensive obfuscation of cryptographic operations, in accordance with at least some embodiments.

FIG. 5 and FIG. 6 are flow diagrams of example methods 500 and 600 respectively that are related to obfuscation of cryptographic operations, in accordance with at least some embodiments. In at least one embodiment, methods 500 and 600 may be performed by various processing devices and logic circuits of computing device 400, e.g., by cryptographic accelerator 450. Methods 500 and 600 may be performed by multiple processing units (e.g., by a combination of two or more of CPU 410, GPUs 430, cryptographic accelerator 450, or other processing logic not shown explicitly in FIG. 4). Processing units may be operating in communication with one or more memory devices (such as cache 412, memory 420, and the like). In at least one embodiment, some of the operations of method 500 may be performed by multiple logic circuits (e.g., by multiple S-Boxes 300-1, 300-2, . . . 300-N) or processing threads (e.g., CPU threads and/or GPU threads), each logic circuit or thread executing one or more individual functions, routines, subroutines, or operations of the method. In at least one embodiment, logic circuits or processing threads implementing methods 500 and 600 may be synchronized (e.g., using semaphores, critical sections, and/or other thread synchronization mechanisms). Alternatively, logic circuits or processing threads implementing methods 500 and 600 may be executed asynchronously with respect to each other. Various operations of methods 500 and 600 may be performed in a different order compared with the order shown in FIG. 5 and FIG. 6. Some operations of the methods may be performed concurrently with other operations. In at least one embodiment, one or more operations shown in FIG. 5 and FIG. 6 may not always be performed. Methods 500 and 600 may be performed to obfuscate cryptographic operations, decrease signal-to-noise ratio, and make it more difficult for an attacker to mount a successful side-channel attack by using SPA, DPA, statistical analysis, and other techniques to identify secret keys, confidential messages, and other information intended to remain secret.

FIG. 5 is a flow diagram of an example method 500 of comprehensive obfuscation of cryptographic operations, in accordance with at least some embodiments. Processing units performing method 500 may identify, at block 510, an input value into a cryptographic operation and a cryptographic key associated with the cryptographic operation. The cryptographic operation can be an encryption operation, a decryption operation, an instance of a digital signature algorithm, and the like. The input value may be a message M to be encrypted, e.g., a plaintext message whose alphanumeric characters are represented via binary numbers, e.g., using ASCII encoding or any other appropriate type of correspondence. In some embodiments, the input value may be a ciphertext C to be decrypted and transformed into an alphanumerical string. The cryptographic key K may be any appropriate secret key that is usable for encryption of the input value, decryption of the input value, or any other cryptographic operation that involves the input value.

Processing units performing method 500 may compute, based on the input value and the cryptographic key, an output value of the cryptographic operation. For example, if the cryptographic operation is an encryption operation, the output value may a ciphertext C; if the cryptographic operation is a decryption operation, the output value may a plaintext message M. In some embodiments, computing the output value of the cryptographic operation may be performed by computing two or more shares of the output value, as described below in conjunction with method 600 directing to hiding the input value and the cryptographic key.

To perform a computation of the output value of the cryptographic operation, the processing units performing method 500 may use a plurality of iterations. Each of the plurality of iterations may include processing in parallel a plurality of stage inputs through a plurality of stages, with each stage input being processed by a respective stage. At block 520, method 500 may continue with computing, based on the input value and the cryptographic key, a common value for a plurality of stages of the cryptographic operation. At block 530, processing units performing method 500 may process in parallel a plurality of stage inputs through the plurality of stages. Each stage input may be processed by a respective stage, each of the plurality of stage inputs derived from the common value.

In one example embodiment, the plurality of stages may include at least some of Stages Two through Six of an S-Box depicted in FIG. 3, each performing a respective portion of a substitution box of an AES cryptographic algorithm. In some embodiments, some or all of the plurality of stage inputs may be processed concurrently with processing of other stage inputs. Accordingly, this makes it more difficult for a potential attacker to analyze computations performed by various stages, since the majority of the stages may always be performing obfuscating dummy computations.

In some embodiments, prior to a first iteration (e.g., after operations of linear mapping Stage One 310 and prior to operations of Stage Two 320) the common value (stored in stage status register 380) may include a first portion and a second portion. The first portion may include an output of the linear mapping stage (e.g., Stage One 310 of AES cryptographic algorithm), and the second portion may include random bits. Specifically, random bits may be added to the stage status register since the output of the first iteration (e.g., 16 bits) may be smaller than the size of the stage status register (e.g., 32 bits). Prior to each iteration, the stage status register may be used to store the common value which may be used as an input into multiple stages of the respective iteration. Likewise, after the respective iteration is completed, a new common value (which may be an output of a currently active stage of the respective iteration) may be stored in the same stage status register.

At block 540, processing units performing method 500 may select one of the plurality of stages as an active stage of the respective iteration. For example, Stage Two 320 may be selected as the active stage of the first iteration; Stage Three 330 may be selected as the active stage of the second iteration; Stage Four 340 may be selected as the active stage of the fourth iteration; Stage Five 350 may be selected as the active stage of the fifth iteration; Stage Six 360 may be selected as the active stage of the sixth iteration.

Processing units performing method 500 may store an output of the active stage as the new common value for the next iteration. At block 550, processing units performing method 500 may repeat blocks 530 and 540 using an output of the preceding active stage as the common value until each of the plurality of stages has been selected as the active stage.

As a result, correct actual data may be propagated through all stages of the S-Box in the appropriate order without being contaminated with dummy outputs of the stages that are not currently active and whose purpose is to obfuscate the actual data by masking the emissions generated during actual computations (with emissions generated during dummy computations by inactive stages). At block 560, processing units performing method 500 may obtain an output value of the cryptographic operation using an output of a last active stage. The output value of the cryptographic operation may be a ciphertext (for an encryption operation) or a plaintext (for a decryption operation). In various implementations, multiple other operations may be performed after obtaining the output of the last active stage and before the output value of the full cryptographic operation is obtained. For example, such additional operations as ShiftRows, MixColumns, AddRoundKey, etc., may be performed after blocks 510-560 based on the output of the last active stage. Additionally, multiple AES rounds may be performed before the output value of the cryptographic operation is obtained, each round including performance of its own S-Box blocks 530-550 as well as respective ShiftRows, MixColumns, AddRoundKey operations. The total number of rounds may depend on a specific cryptographic algorithm being used, e.g., 10 rounds for AES-128, 12 rounds for AES-192, 14 rounds for AES-256, and so on. Similar stages, operations, and rounds of operations may be used for decryption and encryption operations.

FIG. 6 is a flow diagram of an example method 600 of hiding of secret information as part of comprehensive obfuscation of cryptographic operations, in accordance with at least some embodiments. Method 600 may be performed together with method 500, e.g., in conjunction with block 520 of method 500. Block 610 may be performed similarly to block 510 of method 500 with the processing units identifying an input value M into a cryptographic operation and a cryptographic key K associated with the cryptographic operation.

In some embodiments, computing the output value of the cryptographic operation may be performed by computing two or more shares of the output value. In such embodiments, separate inputs into the shares may be prepared. For example, an input into a first share may include a first random number R1 and a second random number R2. Similarly, an input into a second share may include the input value M (or C) into the cryptographic operation, the cryptographic key K, the first random number R1, and the second random number R2. In some embodiments, the input value and the cryptographic key in the second share may be masked by random numbers, e.g., the combinations M⊕R1 and K⊕R2 (or similar) may be used as inputs into the second share.

With blocks 620-642, processing units performing method 600 may hide inputs into the shares by using dummy data to randomize an order in which the inputs are stored (e.g., in state and key registers of the respective shares). In some embodiments, at block 620, method 600 may determine whether an input selector has a first value or a second value. If the input selector has the first value, at block 630, the processing units may, at a first clock cycle, store a first state register for the first share and a second state register for the second share. Similarly, at block 631, the processing units may store a first key register for the first share, and a second key register for the second share.

At block 640, the processing units performing method 600 may, at a second clock cycle, overwrite the first state register with the first random number (e.g., R1) and overwrite the first key register with the second random number (e.g., R2). At block 641, the processing units performing method 600 may overwrite the state register for the second share with a first number (e.g., M⊕R1) that is based on (i) the input value (e.g., M) into the cryptographic operation and (ii) the first random number (e.g., R1). The processing units may further overwrite the key register of the second share with a second number (e.g., K⊕R2) that is based on the cryptographic key (e.g., K) and the second random number (e.g., R2).

If it has been determined at block 620 that the input selector has the second value, the processing units may store the inputs using a different sequence corresponding to the 632-642 branch in FIG. 6. In such instances, at a first clock cycle, the processing units may store, at block 632, the first random number (e.g., R1) in a first state register for the first share, and store the second random number (e.g., R2) in a first key register for the first share. Additionally, at block 633, the processing units may store, in the state register for the second share, a first number (e.g., M⊕R1) that is based on (i) the input value (e.g., M) into the cryptographic operation and (ii) the first random number (e.g., R1), and also store, in the key register for the second share a second number (e.g., K⊕R2) that is based on the cryptographic key (e.g., K) and the second random number (e.g., R2). Subsequently, at block 642, at a second clock cycle, the processing units may store dummy data in one or more stage status registers.

After performing blocks 620-642 and, therefore, hiding the store operations for the input value and the cryptographic key by spreading the store operations over multiple (two or more) clock cycles, method 600 may continue with the processing units performing a computation of the output value of the cryptographic operation. For example, at block 650, the processing units performing method 600 may process S-Box stage inputs (stored in respective stage status registers) using a plurality of iterations. Each of the plurality of iterations may include processing in parallel a plurality of stage inputs derived from a common value through a plurality of stages, e.g., as described above in conjunction with blocks 530-550 of method 500.

Inference and Training Logic

Figure 7A:
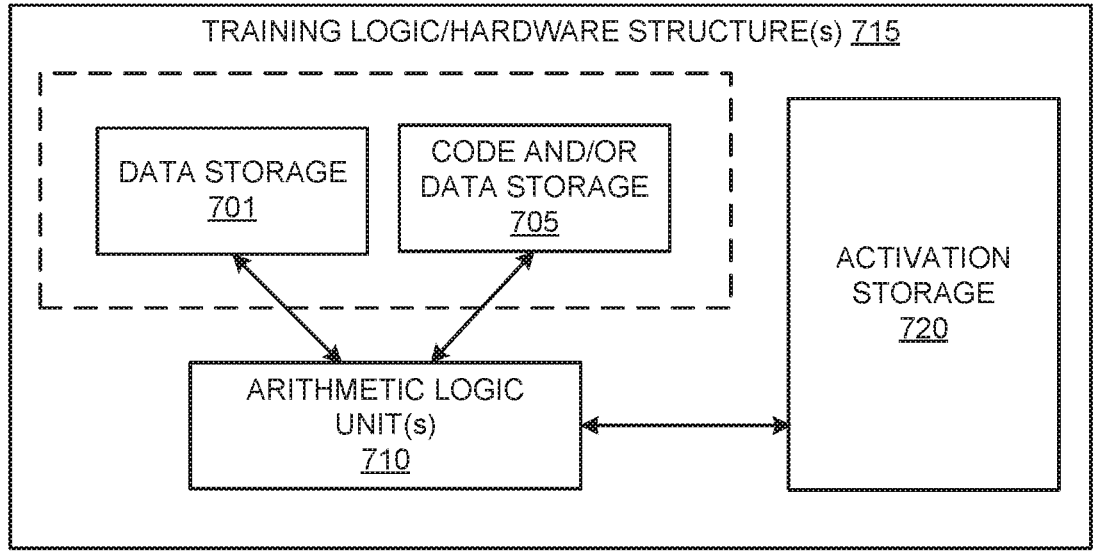
FIG. 7A illustrates inference and/or training logic, according to at least one embodiment.

FIG. 7A illustrates inference and/or training logic 715 used to perform inferencing and/or training operations associated with one or more embodiments.

In at least one embodiment, inference and/or training logic 715 may include, without limitation, code and/or data storage 701 to store forward and/or output weight and/or input/output data, and/or other parameters to configure neurons or layers of a neural network trained and/or used for inferencing in aspects of one or more embodiments. In at least one embodiment, training logic 715 may include, or be coupled to code and/or data storage 701 to store graph code or other software to control the timing and/or order, in which weight and/or other parameter information is to be loaded to configure, logic, including integer and/or floating point units (collectively, arithmetic logic units (ALUs) or simply circuits). In at least one embodiment, code, such as graph code, loads weight or other parameter information into processor ALUs based on an architecture of a neural network to which such code corresponds. In at least one embodiment, code and/or data storage 701 stores weight parameters and/or input/output data of each layer of a neural network trained or used in conjunction with one or more embodiments during forward propagation of input/output data and/or weight parameters during training and/or inferencing using aspects of one or more embodiments. In at least one embodiment, any appropriate portion of code and/or data storage

701 may be included with other on-chip or off-chip data storage, including a processor's L1, L2, or L3 cache or system memory.

In at least one embodiment, any appropriate portion of code and/or data storage 701 may be internal or external to one or more processors or other hardware logic devices or circuits. In at least one embodiment, code and/or code and/or data storage 701 may be cache memory, dynamic randomly addressable memory ("DRAM"), static randomly addressable memory ("SRAM"), non-volatile memory (e.g., flash memory), or other storage. In at least one embodiment, a choice of whether code and/or code and/or data storage 701 is internal or external to a processor, for example, or comprising DRAM, SRAM, flash, or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 715 may include, without limitation, a code and/or data storage 705 to store backward and/or output weight and/or input/output data corresponding to neurons or layers of a neural network trained and/or used for inferencing in aspects of one or more embodiments. In at least one embodiment, code and/or data storage 705 stores weight parameters and/or input/output data of each layer of a neural network trained or used in conjunction with one or more embodiments during backward propagation of input/output data and/or weight parameters during training and/or inferencing using aspects of one or more embodiments. In at least one embodiment, training logic 715 may include, or be coupled to code and/or data storage 705 to store graph code or other software to control the timing and/or order, in which weight and/or other parameter information is to be loaded to configure, logic, including integer and/or floating point units (collectively, arithmetic logic units (ALUs).

In at least one embodiment, code, such as graph code, causes the loading of weight or other parameter information into processor ALUs based on an architecture of a neural network to which such code corresponds. In at least one embodiment, any appropriate portion of code and/or data storage 705 may be included with other on-chip or off-chip data storage, including a processor's L1, L2, or L3 cache or system memory. In at least one embodiment, any appropriate portion of code and/or data storage 705 may be internal or external to one or more processors or other hardware logic devices or circuits. In at least one embodiment, code and/or data storage 705 may be cache memory, DRAM. SRAM, non-volatile memory (e.g., flash memory), or other storage. In at least one embodiment, a choice of whether code and/or data storage 705 is internal or external to a processor, for example, or comprising DRAM, SRAM, flash memory or some other storage type may depend on available storage on-chip versus off-chip, latency requirements of training and/or inferencing functions being performed, batch size of data used in inferencing and/or training of a neural network, or some combination of these factors.

In at least one embodiment, code and/or data storage 701 and code and/or data storage 705 may be separate storage structures. In at least one embodiment, code and/or data storage 701 and code and/or data storage 705 may be a combined storage structure. In at least one embodiment, code and/or data storage 701 and code and/or data storage 705 may be partially combined and partially separate. In at least one embodiment, any appropriate portion of code and/or data storage 701 and code and/or data storage 705 may be included with other on-chip or off-chip data storage, including a processor's L1, L2, or L3 cache or system memory.

In at least one embodiment, inference and/or training logic 715 may include, without limitation, one or more arithmetic logic unit(s) ("ALU(s)") 710, including integer and/or floating point units, to perform logical and/or mathematical operations based, at least in part on, or indicated by, training and/or inference code (e.g., graph code), a result of which may produce activations (e.g., output values from layers or neurons within a neural network) stored in an activation storage 720 that are functions of input/output and/or weight parameter data stored in code and/or data storage 701 and/or code and/or data storage 705. In at least one embodiment, activations stored in activation storage 720 are generated according to linear algebraic and or matrix-based mathematics performed by ALU(s) 710 in response to performing instructions or other code, wherein weight values stored in code and/or data storage 705 and/or data storage 701 are used as operands along with other values, such as bias values, gradient information, momentum values, or other parameters or hyperparameters, any or all of which may be stored in code and/or data storage 705 or code and/or data storage 701 or another storage on or off-chip.

In at least one embodiment, ALU(s) 710 are included within one or more processors or other hardware logic devices or circuits, whereas in another embodiment, ALU(s) 710 may be external to a processor or other hardware logic device or circuit that uses them (e.g., a co-processor). In at least one embodiment, ALU(s) 710 may be included within a processor's execution units or otherwise within a bank of ALUs accessible by a processor's execution units either within the same processor or distributed between different processors of different types (e.g., central processing units, graphics processing units, fixed function units, etc.). In at least one embodiment, code and/or data storage 701, code and/or data storage 705, and activation storage 720 may share a processor or other hardware logic device or circuit, whereas, in another embodiment, they may be in different processors or other hardware logic devices or circuits, or some combination of same and different processors or other hardware logic devices or circuits. In at least one embodiment, any appropriate portion of activation storage 720 may be included with other on-chip or off-chip data storage, including a processor's L1, L2, or L3 cache or system memory. Furthermore, inferencing and/or training code may be stored with other code accessible to a processor or other hardware logic or circuit and fetched and/or processed using a processor's fetch, decode, scheduling, execution, retirement, and/or other logical circuits.

In at least one embodiment, activation storage 720 may be cache memory, DRAM, SRAM, non-volatile memory (e.g., flash memory), or other storage. In at least one embodiment, activation storage 720 may be completely or partially within or external to one or more processors or other logical circuits. In at least one embodiment, a choice of whether activation storage 720 is internal or external to a processor, for example, or comprising DRAM, SRAM, flash memory or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 715 illustrated in FIG. 7A may be used in conjunction with an application-specific integrated circuit ("ASIC"), such as a TensorFlow®, Processing Unit from Google, an inference processing unit (IPU) from Graphcore™, or a Nervana® (e.g., "Lake Crest") processor from Intel Corp. In at least one embodiment, inference and/or training logic 715 illustrated in FIG. 7A may be used in conjunction with central processing unit ("CPU") hardware, graphics processing unit ("GPU") hardware, or other hardware, such as field programmable gate arrays ("FPGAs").

Figure 7B:
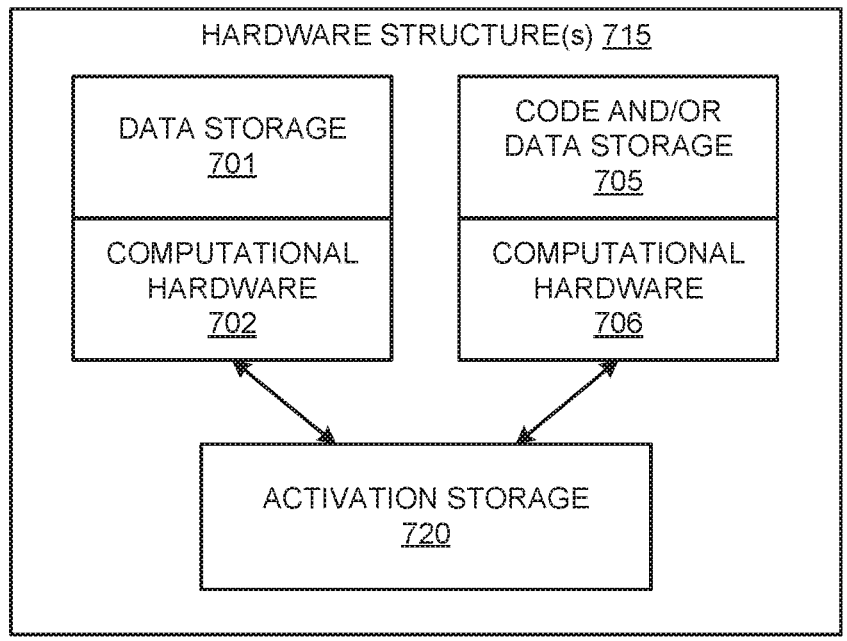
FIG. 7B illustrates inference and/or training logic, according to at least one embodiment.

FIG. 7B illustrates inference and/or training logic 715, according to at least one embodiment. In at least one embodiment, inference and/or training logic 715 may include, without limitation, hardware logic in which computational resources are dedicated or otherwise exclusively used in conjunction with weight values or other information corresponding to one or more layers of neurons within a neural network. In at least one embodiment, inference and/or training logic 715 illustrated in FIG. 7B may be used in conjunction with an application-specific integrated circuit (ASIC), such as TensorFlow® Processing Unit from Google, an inference processing unit (IPU) from Graphcore™, or a Nervana® (e.g., "Lake Crest") processor from Intel Corp. In at least one embodiment, inference and/or training logic 715 illustrated in FIG. 7B may be used in conjunction with central processing unit (CPU) hardware, graphics processing unit (GPU) hardware, or other hardware, such as field programmable gate arrays (FPGAs). In at least one embodiment, inference and/or training logic 715 includes, without limitation, code and/or data storage 701 and code and/or data storage 705, which may be used to store code (e.g., graph code), weight values and/or other information, including bias values, gradient information, momentum values, and/or other parameter or hyperparameter information. In at least one embodiment illustrated in FIG. 7B, each of code and/or data storage 701 and code and/or data storage 705 is associated with a dedicated computational resource, such as computational hardware 702 and computational hardware 706, respectively. In at least one embodiment, each of computational hardware 702 and computational hardware 706 comprises one or more ALUs that perform mathematical functions, such as linear algebraic functions, only on information stored in code and/or data storage 701 and code and/or data storage 705, respectively, the result of which is stored in activation storage 720.

In at least one embodiment, each of code and/or data storage 701 and 105 and corresponding computational hardware 702 and 706, respectively, correspond to different layers of a neural network, such that resulting activation from one storage/computational pair 701/702 of code and/or data storage 701 and computational hardware 702 is provided as an input to a next storage/computational pair 705/706 of code and/or data storage 705 and computational hardware 706, in order to mirror a conceptual organization of a neural network. In at least one embodiment, each of storage/computational pairs 701/702 and 705/706 may correspond to more than one neural network layer. In at least one embodiment, additional storage/computation pairs (not shown) subsequent to or in parallel with storage/computation pairs 701/702 and 705/706 may be included in inference and/or training logic 715.

Neural Network Training and Deployment

Figure 8:
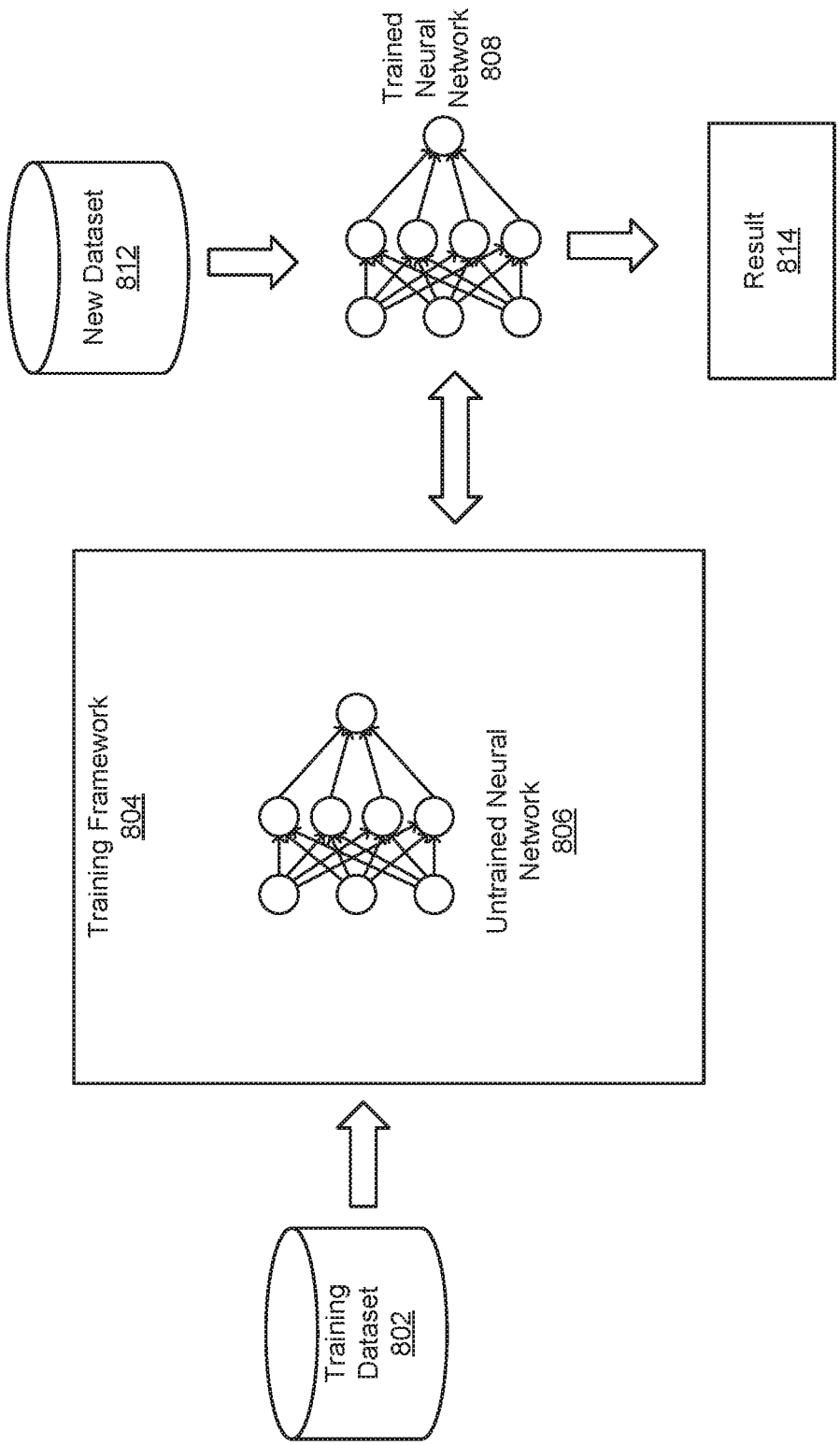
FIG. 8 illustrates training and deployment of a neural network, according to at least one embodiment.

FIG. 8 illustrates training and deployment of a deep neural network, according to at least one embodiment. In at least one embodiment, untrained neural network 806 is trained using a training dataset 802. In at least one embodiment, training framework 804 is a PyTorch framework, whereas in other embodiments, training framework 804 is a TensorFlow, Boost, Caffe, Microsoft Cognitive Toolkit/CNTK, MXNet, Chainer, Keras, Deeplearning4j, or other training framework. In at least one embodiment, training framework 804 trains an untrained neural network 806 and enables it to be trained using processing resources described herein to generate a trained neural network 808. In at least one embodiment, weights may be chosen randomly or by pre-training using a deep belief network. In at least one embodiment, training may be performed in either a supervised, partially supervised, or unsupervised manner.

In at least one embodiment, untrained neural network 806 is trained using supervised learning, wherein training dataset 802 includes an input paired with a desired output for an input, or where training dataset 802 includes input having a known output and an output of neural network 806 is manually graded. In at least one embodiment, untrained neural network 806 is trained in a supervised manner and processes inputs from training dataset 802 and compares resulting outputs against a set of expected or desired outputs. In at least one embodiment, errors are then propagated back through untrained neural network 806. In at least one embodiment, training framework 804 adjusts weights that control untrained neural network 806. In at least one embodiment, training framework 804 includes tools to monitor how well untrained neural network 806 is converging towards a model, such as trained neural network 808, suitable to generating correct answers, such as in result 814, based on input data such as a new dataset 812. In at least one embodiment, training framework 804 trains untrained neural network 806 repeatedly while adjusting weights to refine an output of untrained neural network 806 using a loss function and adjustment algorithm, such as stochastic gradient descent. In at least one embodiment, training framework 804 trains untrained neural network 806 until untrained neural network 806 achieves a desired accuracy. In at least one embodiment, trained neural network 808 can then be deployed to implement any appropriate number of machine learning operations.

In at least one embodiment, untrained neural network 806 is trained using unsupervised learning, wherein untrained neural network 806 attempts to train itself using unlabeled data. In at least one embodiment, unsupervised learning training dataset 802 will include input data without any appropriate associated output data or "ground truth" data. In at least one embodiment, untrained neural network 806 can learn groupings within training dataset 802 and can determine how individual inputs are related to untrained dataset 802. In at least one embodiment, unsupervised training can be used to generate a self-organizing map in trained neural network 808 capable of performing operations useful in reducing dimensionality of new dataset 812. In at least one embodiment, unsupervised training can also be used to perform anomaly detection, which allows identification of data points in new dataset 812 that deviate from normal patterns of new dataset 812.

In at least one embodiment, semi-supervised learning may be used, which is a technique in which in training dataset 802 includes a mix of labeled and unlabeled data. In at least one embodiment, training framework 804 may be used to perform incremental learning, such as through transferred learning techniques. In at least one embodiment, incremental learning enables trained neural network 808 to adapt to new dataset 812 without forgetting knowledge instilled within trained neural network 808 during initial training.

Figure 9:
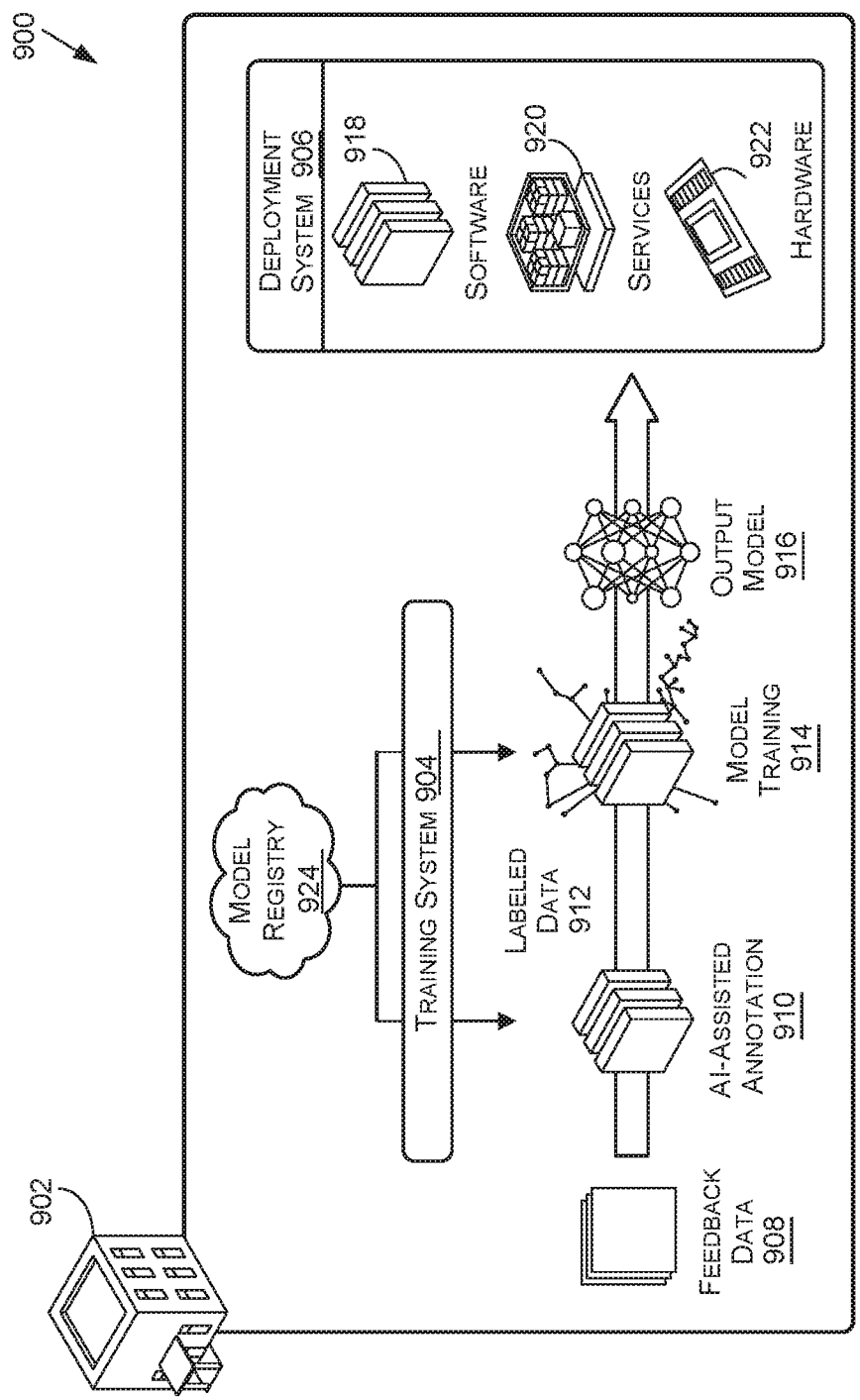
FIG. 9 is an example data flow diagram for an advanced computing pipeline, according to at least one embodiment.

With reference to FIG. 9, FIG. 9 is an example data flow diagram for a process 900 of generating and deploying a processing and inferencing pipeline, according to at least one embodiment. In at least one embodiment, process 900 may be deployed to perform game name recognition analysis and inferencing on user feedback data at one or more facilities 902, such as a data center.

In at least one embodiment, process 900 may be executed within a training system 904 and/or a deployment system 906. In at least one embodiment, training system 904 may be used to perform training, deployment, and embodiment of machine learning models (e.g., neural networks, object detection algorithms, computer vision algorithms, etc.) for use in deployment system 906. In at least one embodiment, deployment system 906 may be configured to offload processing and compute resources among a distributed computing environment to reduce infrastructure requirements at facility 902. In at least one embodiment, deployment system 906 may provide a streamlined platform for selecting, customizing, and implementing virtual instruments for use with computing devices at facility 902. In at least one embodiment, virtual instruments may include software-defined applications for performing one or more processing operations with respect to feedback data. In at least one embodiment, one or more applications in a pipeline may use or call upon services (e.g., inference, visualization, compute, AI, etc.) of deployment system 906 during execution of applications.

In at least one embodiment, some of applications used in advanced processing and inferencing pipelines may use machine learning models or other AI to perform one or more processing steps. In at least one embodiment, machine learning models may be trained at facility 902 using feedback data 908 (such as feedback data) stored at facility 902 or feedback data 908 from another facility or facilities, or a combination thereof. In at least one embodiment, training system 904 may be used to provide applications, services, and/or other resources for generating working, deployable machine learning models for deployment system 906.

In at least one embodiment, a model registry 924 may be backed by object storage that may support versioning and object metadata. In at least one embodiment, object storage may be accessible through, for example, a cloud storage (e.g., a cloud 1026 of FIG. 10) compatible application programming interface (API) from within a cloud platform. In at least one embodiment, machine learning models within model registry 924 may be uploaded, listed, modified, or deleted by developers or partners of a system interacting with an API. In at least one embodiment, an API may provide access to methods that allow users with appropriate credentials to associate models with applications, such that models may be executed as part of execution of containerized instantiations of applications.

In at least one embodiment, a training pipeline 1004 (FIG. 10) may include a scenario where facility 902 is training their own machine learning model, or has an existing machine learning model that needs to be optimized or updated. In at least one embodiment, feedback data 908 may be received from various channels, such as forums, web forms, or the like. In at least one embodiment, once feedback data 908 is received, AI-assisted annotation 910 may be used to aid in generating annotations corresponding to feedback data 908 to be used as ground truth data for a machine learning model. In at least one embodiment, AI-assisted annotation 910 may include one or more machine learning models (e.g., convolutional neural networks (CNNs)) that may be trained to generate annotations corresponding to certain types of feedback data 908 (e.g., from certain devices) and/or certain types of anomalies in feedback data 908. In at least one embodiment, AI-assisted annotations 910 may then be used directly, or may be adjusted or fine-tuned using an annotation tool, to generate ground truth data. In at least one embodiment, in some examples, labeled data 912 may be used as ground truth data for training a machine learning model. In at least one embodiment, AI-assisted annotations 910, labeled data 912, or a combination thereof may be used as ground truth data for training a machine learning model. In at least one embodiment, a trained machine learning model may be referred to as an output model 916, and may be used by deployment system 906, as described herein.

In at least one embodiment, training pipeline 1004 (FIG. 10) may include a scenario where facility 902 needs a machine learning model for use in performing one or more processing tasks for one or more applications in deployment system 906, but facility 902 may not currently have such a machine learning model (or may not have a model that is optimized, efficient, or effective for such purposes). In at least one embodiment, an existing machine learning model may be selected from model registry 924. In at least one embodiment, model registry 924 may include machine learning models trained to perform a variety of different inference tasks on imaging data. In at least one embodiment, machine learning models in model registry 924 may have been trained on imaging data from different facilities than facility 902 (e.g., facilities remotely located). In at least one embodiment, machine learning models may have been trained on imaging data from one location, two locations, or any appropriate number of locations. In at least one embodiment, when being trained on imaging data from a specific location, training may take place at that location, or at least in a manner that protects confidentiality of imaging data or restricts imaging data from being transferred off-premises (e.g., to comply with HIPAA regulations, privacy regulations, etc.). In at least one embodiment, once a model is trained—or partially trained—at one location, a machine learning model may be added to model registry 924. In at least one embodiment, a machine learning model may then be retrained, or updated, at any appropriate number of other facilities, and a retrained or updated model may be made available in model registry 924. In at least one embodiment, a machine learning model may then be selected from model registry 924—and referred to as output model 916—and may be used in deployment system 906 to perform one or more processing tasks for one or more applications of a deployment system.

In at least one embodiment, training pipeline 1004 (FIG. 10) may be used in a scenario that includes facility 902 requiring a machine learning model for use in performing one or more processing tasks for one or more applications in deployment system 906, but facility 902 may not currently have such a machine learning model (or may not have a model that is optimized, efficient, or effective for such purposes). In at least one embodiment, a machine learning model selected from model registry 924 might not be fine-tuned or optimized for feedback data 908 generated at facility 902 because of differences in populations, genetic variations, robustness of training data used to train a machine learning model, diversity in anomalies of training data, and/or other issues with training data. In at least one embodiment, AI-assisted annotation 910 may be used to aid in generating annotations corresponding to feedback data 908 to be used as ground truth data for retraining or updating a machine learning model. In at least one embodiment, labeled data 912 may be used as ground truth data for training a machine learning model. In at least one embodiment, retraining or updating a machine learning model may be referred to as model training 914. In at least one embodiment, model training 914—e.g., AI-assisted annotations 910, labeled data 912, or a combination thereof—may be used as ground truth data for retraining or updating a machine learning model.

In at least one embodiment, deployment system 906 may include software 918, services 920, hardware 922, and/or other components, features, and functionality. In at least one embodiment, deployment system 906 may include a software "stack," such that software 918 may be built on top of services 920 and may use services 920 to perform some or all of processing tasks, and services 920 and software 918 may be built on top of hardware 922 and use hardware 922 to execute processing, storage, and/or other compute tasks of deployment system 906.

In at least one embodiment, software 918 may include any appropriate number of different containers, where each container may execute an instantiation of an application. In at least one embodiment, each application may perform one or more processing tasks in an advanced processing and inferencing pipeline (e.g., inferencing, object detection, feature detection, segmentation, image enhancement, calibration, etc.). In at least one embodiment, for each type of computing device, there may be any appropriate number of containers that may perform a data processing task with respect to feedback data 908 (or other data types, such as those described herein). In at least one embodiment, an advanced processing and inferencing pipeline may be defined based on selections of different containers that are desired or required for processing feedback data 908, in addition to containers that receive and configure imaging data for use by each container and/or for use by facility 902 after processing through a pipeline (e.g., to convert outputs back to a usable data type for storage and display at facility 902). In at least one embodiment, a combination of containers within software 918 (e.g., that make up a pipeline) may be referred to as a virtual instrument (as described in more detail herein), and a virtual instrument may leverage services 920 and hardware 922 to execute some or all processing tasks of applications instantiated in containers.

In at least one embodiment, data may undergo pre-processing as part of data processing pipeline to prepare data for processing by one or more applications. In at least one embodiment, post-processing may be performed on an output of one or more inferencing tasks or other processing tasks of a pipeline to prepare an output data for a next application and/or to prepare output data for transmission and/or use by a user (e.g., as a response to an inference request). In at least one embodiment, inferencing tasks may be performed by one or more machine learning models, such as trained or deployed neural networks, which may include output models 916 of training system 904.

In at least one embodiment, tasks of data processing pipeline may be encapsulated in a container(s) that each represent a discrete, fully functional instantiation of an application and virtualized computing environment that is able to reference machine learning models. In at least one embodiment, containers or applications may be published into a private (e.g., limited access) area of a container registry (described in more detail herein), and trained or deployed models may be stored in model registry 924 and associated with one or more applications. In at least one embodiment, images of applications (e.g., container images) may be available in a container registry, and once selected by a user from a container registry for deployment in a pipeline, an image may be used to generate a container for an instantiation of an application for use by a user's system.

In at least one embodiment, developers may develop, publish, and store applications (e.g., as containers) for performing processing and/or inferencing on supplied data. In at least one embodiment, development, publishing, and/or storing may be performed using a software development kit (SDK) associated with a system (e.g., to ensure that an application and/or container developed is compliant with or compatible with a system). In at least one embodiment, an application that is developed may be tested locally (e.g., at a first facility, on data from a first facility) with an SDK which may support at least some of services 920 as a system (e.g., system 1000 of FIG. 10). In at least one embodiment, once validated by system 1000 (e.g., for accuracy, etc.), an application may be available in a container registry for selection and/or embodiment by a user (e.g., a hospital, clinic, lab, healthcare provider, etc.) to perform one or more processing tasks with respect to data at a facility (e.g., a second facility) of a user.

Figure 10:
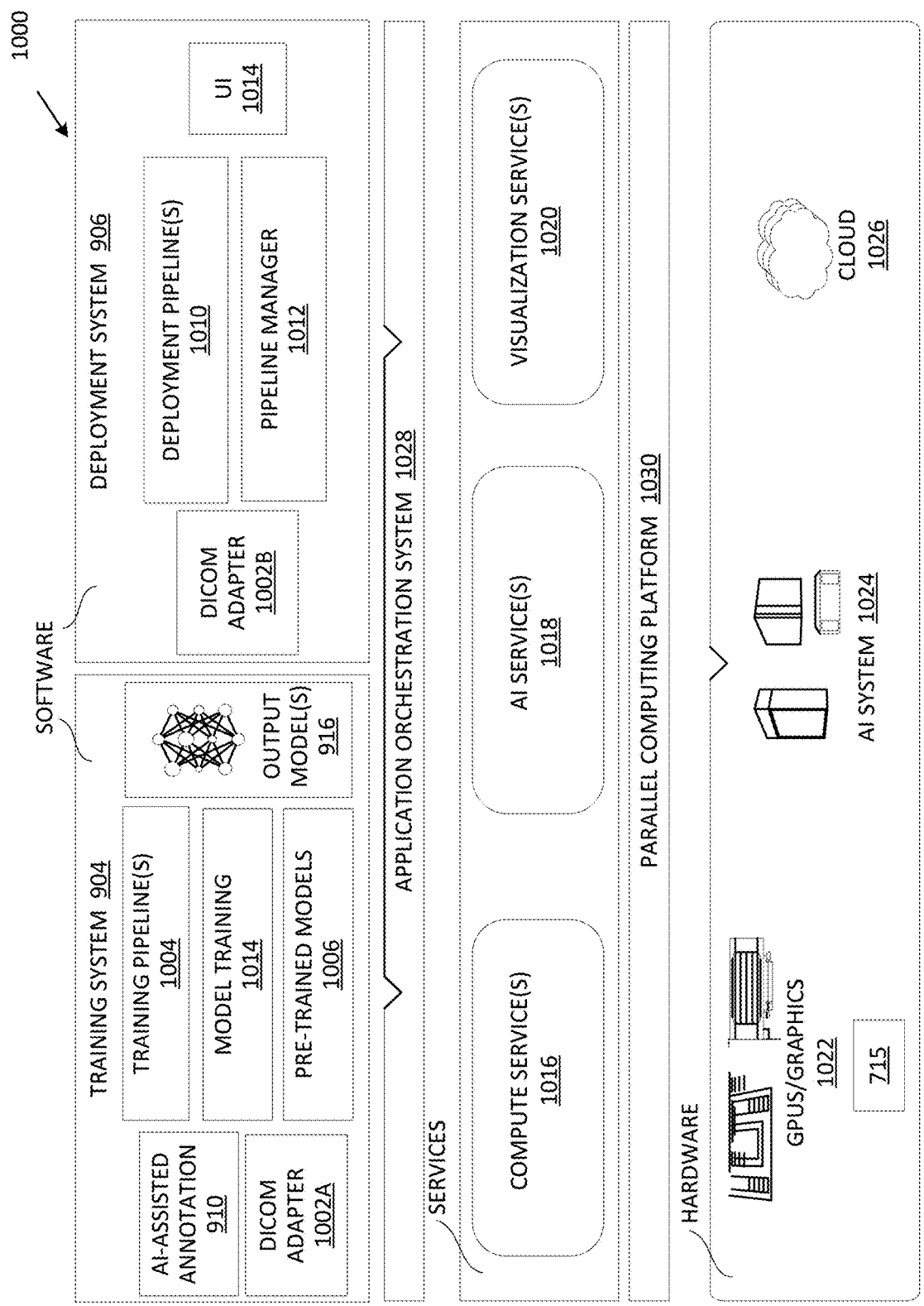
FIG. 10 is a system diagram for an example system for training, adapting, instantiating, and deploying machine learning models in an advanced computing pipeline, according to at least one embodiment.

In at least one embodiment, developers may then share applications or containers through a network for access and use by users of a system (e.g., system 1000 of FIG. 10). In at least one embodiment, completed and validated applications or containers may be stored in a container registry and associated machine learning models may be stored in model registry 924. In at least one embodiment, a requesting entity—who provides an inference or image processing request—may browse a container registry and/or model registry 924 for an application, container, dataset, machine learning model, etc., select a desired combination of elements for inclusion in data processing pipeline, and submit an processing request. In at least one embodiment, a request may include input data that is necessary to perform a request, and/or may include a selection of application(s) and/or machine learning models to be executed in processing a request. In at least one embodiment, a request may then be passed to one or more components of deployment system 906 (e.g., a cloud) to perform processing of data processing pipeline. In at least one embodiment, processing by deployment system 906 may include referencing selected elements (e.g., applications, containers, models, etc.) from a container registry and/or model registry 924. In at least one embodiment, once results are generated by a pipeline, results may be returned to a user for reference (e.g., for viewing in a viewing application suite executing on a local, on-premises workstation or terminal).

In at least one embodiment, to aid in processing or execution of applications or containers in pipelines, services 920 may be leveraged. In at least one embodiment, services 920 may include compute services, artificial intelligence (AI) services, visualization services, and/or other service types. In at least one embodiment, services 920 may provide functionality that is common to one or more applications in software 918, so functionality may be abstracted to a service that may be called upon or leveraged by applications. In at least one embodiment, functionality provided by services 920 may run dynamically and more efficiently, while also scaling well by allowing applications to process data in parallel (e.g., using a parallel computing platform 1030 (FIG. 10)). In at least one embodiment, rather than each application that shares a same functionality offered by a service 920 being required to have a respective instance of service 920, service 920 may be shared between and among various applications. In at least one embodiment, services may include an inference server or engine that may be used for executing detection or segmentation tasks, as non-limiting examples. In at least one embodiment, a model training service may be included that may provide machine learning model training and/or retraining capabilities.

In at least one embodiment, where a service 920 includes an AI service (e.g., an inference service), one or more machine learning models associated with an application for anomaly detection (e.g., tumors, growth abnormalities, scarring, etc.) may be executed by calling upon (e.g., as an API call) an inference service (e.g., an inference server) to execute machine learning model(s), or processing thereof, as part of application execution. In at least one embodiment, where another application includes one or more machine learning models for segmentation tasks, an application may call upon an inference service to execute machine learning models for performing one or more of processing operations associated with segmentation tasks. In at least one embodiment, software 918 implementing advanced processing and inferencing pipeline may be streamlined because each application may call upon a same inference service to perform one or more inferencing tasks.

In at least one embodiment, hardware 922 may include GPUs, CPUs, graphics cards, an AI/deep learning system (e.g., an AI supercomputer, such as NVIDIA's DGX supercomputer system), a cloud platform, or a combination thereof. In at least one embodiment, different types of hardware 922 may be used to provide efficient, purpose-built support for software 918 and services 920 in deployment system 906. In at least one embodiment, use of GPU processing may be implemented for processing locally (e.g., at facility 902), within an AI/deep learning system, in a cloud system, and/or in other processing components of deployment system 906 to improve efficiency, accuracy, and efficacy of game name recognition.

In at least one embodiment, software 918 and/or services 920 may be optimized for GPU processing with respect to deep learning, machine learning, and/or high-performance computing, as non-limiting examples. In at least one embodiment, at least some of computing environment of deployment system 906 and/or training system 904 may be executed in a datacenter one or more supercomputers or high performance computing systems, with GPU optimized software (e.g., hardware and software combination of NVIDIA's DGX system). In at least one embodiment, hardware 922 may include any appropriate number of GPUs that may be called upon to perform processing of data in parallel, as described herein. In at least one embodiment, cloud platform may further include GPU processing for GPU-optimized execution of deep learning tasks, machine learning tasks, or other computing tasks. In at least one embodiment, cloud platform (e.g., NVIDIA's NGC) may be executed using an AI/deep learning supercomputer(s) and/or GPU-optimized software (e.g., as provided on NVIDIA's DGX systems) as a hardware abstraction and scaling platform. In at least one embodiment, cloud platform may integrate an application container clustering system or orchestration system (e.g., KUBERNETES) on multiple GPUs to enable seamless scaling and load balancing.

FIG. 10 is a system diagram for an example system 1000 for generating and deploying a deployment pipeline, according to at least one embodiment. In at least one embodiment, system 1000 may be used to implement process 900 of FIG. 9 and/or other processes including advanced processing and inferencing pipelines. In at least one embodiment, system 1000 may include training system 904 and deployment system 906. In at least one embodiment, training system 904 and deployment system 906 may be implemented using software 918, services 920, and/or hardware 922, as described herein.

In at least one embodiment, system 1000 (e.g., training system 904 and/or deployment system 3006) may implemented in a cloud computing environment (e.g., using cloud 1026). In at least one embodiment, system 1000 may be implemented locally with respect to a facility, or as a combination of both cloud and local computing resources. In at least one embodiment, access to APIs in cloud 1026 may be restricted to authorized users through enacted security measures or protocols. In at least one embodiment, a security protocol may include web tokens that may be signed by an authentication (e.g., AuthN, AuthZ, Gluecon, etc.) service and may carry appropriate authorization. In at least one embodiment, APIs of virtual instruments (described herein), or other instantiations of system 1000, may be restricted to a set of public IPs that have been vetted or authorized for interaction.

In at least one embodiment, various components of system 1000 may communicate between and among one another using any appropriate of a variety of different network types, including but not limited to local area networks (LANs) and/or wide area networks (WANs) via wired and/or wireless communication protocols. In at least one embodiment, communication between facilities and components of system 1000 (e.g., for transmitting inference requests, for receiving results of inference requests, etc.) may be communicated over a data bus or data busses, wireless data protocols (Wi-Fi), wired data protocols (e.g., Ethernet), etc.

In at least one embodiment, training system 904 may execute training pipelines 1004, similar to those described herein with respect to FIG. 9. In at least one embodiment, where one or more machine learning models are to be used in deployment pipelines 1010 by deployment system 906, training pipelines 1004 may be used to train or retrain one or more (e.g., pre-trained) models, and/or implement one or more of pre-trained models 1006 (e.g., without a need for retraining or updating). In at least one embodiment, as a result of training pipelines 1004, output model(s) 916 may be generated. In at least one embodiment, training pipelines 1004 may include any appropriate number of processing steps, AI-assisted annotation 910, labeling or annotating of feedback data 908 to generate labeled data 912, model selection from a model registry, model training 914, training, retraining, or updating models, and/or other processing steps. In at least one embodiment, for different machine learning models used by deployment system 906, different training pipelines 1004 may be used. In at least one embodiment, training pipeline 1004 similar to a first example described with respect to FIG. 9 may be used for a first machine learning model, training pipeline 1004 similar to a second example described with respect to FIG. 9 may be used for a second machine learning model, and training pipeline 1004 similar to a third example described with respect to FIG. 9 may be used for a third machine learning model. In at least one embodiment, any appropriate combination of tasks within training system 904 may be used depending on what is required for each respective machine learning model. In at least one embodiment, one or more of machine learning models may already be trained and ready for deployment so machine learning models may not undergo any appropriate processing by training system 904, and may be implemented by deployment system 906.

In at least one embodiment, output model(s) 916 and/or pre-trained model(s) 1006 may include any appropriate types of machine learning models depending on embodiment or embodiment. In at least one embodiment, and without limitation, machine learning models used by system

1000 may include machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, Long/Short Term Memory (LSTM), Bi-LSTM, Hopfield, Boltzmann, deep belief, deconvolutional, generative adversarial, liquid state machine, etc.), and/or other types of machine learning models.

In at least one embodiment, training pipelines 1004 may include AI-assisted annotation. In at least one embodiment, labeled data 912 (e.g., traditional annotation) may be generated by any appropriate number of techniques. In at least one embodiment, labels or other annotations may be generated within a drawing program (e.g., an annotation program), a computer aided design (CAD) program, a labeling program, another type of program suitable for generating annotations or labels for ground truth, and/or may be hand drawn, in some examples. In at least one embodiment, ground truth data may be synthetically produced (e.g., generated from computer models or renderings), real produced (e.g., designed and produced from real-world data), machine-automated (e.g., using feature analysis and learning to extract features from data and then generate labels), human annotated (e.g., labeler, or annotation expert, defines location of labels), and/or a combination thereof. In at least one embodiment, for each instance of feedback data 908 (or other data type used by machine learning models), there may be corresponding ground truth data generated by training system 904. In at least one embodiment, AI-assisted annotation may be performed as part of deployment pipelines 1010; either in addition to, or in lieu of AI-assisted annotation included in training pipelines 1004. In at least one embodiment, system 1000 may include a multi-layer platform that may include a software layer (e.g., software 918) of diagnostic applications (or other application types) that may perform one or more medical imaging and diagnostic functions.

In at least one embodiment, a software layer may be implemented as a secure, encrypted, and/or authenticated API through which applications or containers may be invoked (e.g., called) from an external environment(s) (e.g., facility 902). In at least one embodiment, applications may then call or execute one or more services 920 for performing compute, AI, or visualization tasks associated with respective applications, and software 918 and/or services 920 may leverage hardware 922 to perform processing tasks in an effective and efficient manner.

In at least one embodiment, deployment system 906 may execute deployment pipelines 1010. In at least one embodiment, deployment pipelines 1010 may include any appropriate number of applications that may be sequentially, non-sequentially, or otherwise applied to feedback data (and/or other data types)—including AI-assisted annotation, as described above. In at least one embodiment, as described herein, a deployment pipeline 1010 for an individual device may be referred to as a virtual instrument for a device. In at least one embodiment, for a single device, there may be more than one deployment pipeline 1010 depending on information desired from data generated by a device.

In at least one embodiment, applications available for deployment pipelines 1010 may include any appropriate application that may be used for performing processing tasks on feedback data or other data from devices. In at least one embodiment, because various applications may share common image operations, in some embodiments, a data augmentation library (e.g., as one of services 920) may be used to accelerate these operations. In at least one embodiment, to avoid bottlenecks of conventional processing approaches that rely on CPU processing, parallel computing platform 1030 may be used for GPU acceleration of these processing tasks.

In at least one embodiment, deployment system 906 may include a user interface 1014 (e.g., a graphical user interface, a web interface, etc.) that may be used to select applications for inclusion in deployment pipeline(s) 1010, arrange applications, modify or change applications or parameters or constructs thereof, use and interact with deployment pipeline(s) 1010 during set-up and/or deployment, and/or to otherwise interact with deployment system 906. In at least one embodiment, although not illustrated with respect to training system 904, user interface 1014 (or a different user interface) may be used for selecting models for use in deployment system 906, for selecting models for training, or retraining, in training system 904, and/or for otherwise interacting with training system 904.

In at least one embodiment, pipeline manager 1012 may be used, in addition to an application orchestration system 1028, to manage interaction between applications or containers of deployment pipeline(s) 1010 and services 920 and/or hardware 922. In at least one embodiment, pipeline manager 1012 may be configured to facilitate interactions from application to application, from application to service 920, and/or from application or service to hardware 922. In at least one embodiment, although illustrated as included in software 918, this is not intended to be limiting, and in some examples pipeline manager 1012 may be included in services 920. In at least one embodiment, application orchestration system 1028 (e.g., Kubernetes, DOCKER, etc.) may include a container orchestration system that may group applications into containers as logical units for coordination, management, scaling, and deployment. In at least one embodiment, by associating applications from deployment pipeline(s) 1010 (e.g., a reconstruction application, a segmentation application, etc.) with individual containers, each application may execute in a self-contained environment (e.g., at a kernel level) to increase speed and efficiency.

In at least one embodiment, each application and/or container (or image thereof) may be individually developed, modified, and deployed (e.g., a first user or developer may develop, modify, and deploy a first application and a second user or developer may develop, modify, and deploy a second application separate from a first user or developer), which may allow for focus on, and attention to, a task of a single application and/or container(s) without being hindered by tasks of another application(s) or container(s). In at least one embodiment, communication, and cooperation between different containers or applications may be aided by pipeline manager 1012 and application orchestration system 1028. In at least one embodiment, so long as an expected input and/or output of each container or application is known by a system (e.g., based on constructs of applications or containers), application orchestration system 1028 and/or pipeline manager 1012 may facilitate communication among and between, and sharing of resources among and between, each of applications or containers. In at least one embodiment, because one or more of applications or containers in deployment pipeline(s) 1010 may share same services and resources, application orchestration system 1028 may orchestrate, load balance, and determine sharing of services or resources between and among various applications or containers. In at least one embodiment, a scheduler may be used to track resource requirements of applications or containers, current usage or planned usage of these resources, and resource availability. In at least one embodiment, a scheduler may thus allocate resources to different applications and distribute resources between and among applications in view of requirements and availability of a system. In some examples, a scheduler (and/or other component of application orchestration system 1028) may determine resource availability and distribution based on constraints imposed on a system (e.g., user constraints), such as quality of service (QoS), urgency of need for data outputs (e.g., to determine whether to execute real-time processing or delayed processing), etc.

In at least one embodiment, services 920 leveraged by and shared by applications or containers in deployment system 906 may include compute services 1016, AI services 1018, visualization services 1020, and/or other service types. In at least one embodiment, applications may call (e.g., execute) one or more of services 920 to perform processing operations for an application. In at least one embodiment, compute services 1016 may be leveraged by applications to perform super-computing or other high-performance computing (HPC) tasks. In at least one embodiment, compute service(s) 1016 may be leveraged to perform parallel processing (e.g., using a parallel computing platform 1030) for processing data through one or more of applications and/or one or more tasks of a single application, substantially simultaneously. In at least one embodiment, parallel computing platform 1030 (e.g., NVIDIA's CUDA) may enable general purpose computing on GPUs (GPGPU) (e.g., GPUs 1022). In at least one embodiment, a software layer of parallel computing platform 1030 may provide access to virtual instruction sets and parallel computational elements of GPUs, for execution of compute kernels. In at least one embodiment, parallel computing platform 1030 may include memory and, in some embodiments, a memory may be shared between and among multiple containers, and/or between and among different processing tasks within a single container. In at least one embodiment, inter-process communication (IPC) calls may be generated for multiple containers and/or for multiple processes within a container to use same data from a shared segment of memory of parallel computing platform 1030 (e.g., where multiple different stages of an application or multiple applications are processing same information). In at least one embodiment, rather than making a copy of data and moving data to different locations in memory (e.g., a read/write operation), same data in same location of a memory may be used for any appropriate number of processing tasks (e.g., at a same time, at different times, etc.). In at least one embodiment, as data is used to generate new data as a result of processing, this information of a new location of data may be stored and shared between various applications. In at least one embodiment, location of data and a location of updated or modified data may be part of a definition of how a payload is understood within containers.

In at least one embodiment, AI services 1018 may be leveraged to perform inferencing services for executing machine learning model(s) associated with applications (e.g., tasked with performing one or more processing tasks of an application). In at least one embodiment, AI services 1018 may leverage AI system 1024 to execute machine learning model(s) (e.g., neural networks, such as CNNs) for segmentation, reconstruction, object detection, feature detection, classification, and/or other inferencing tasks. In at least one embodiment, applications of deployment pipeline(s) 1010 may use one or more of output models 916 from training system 904 and/or other models of applications to perform inference on imaging data (e.g., DICOM data, RIS data, CIS data, REST compliant data. RPC data, raw data, etc.). In at least one embodiment, two or more examples of inferencing using application orchestration system 1028 (e.g., a scheduler) may be available. In at least one embodiment, a first category may include a high priority/low latency path that may achieve higher service level agreements, such as for performing inference on urgent requests during an emergency, or for a radiologist during diagnosis. In at least one embodiment, a second category may include a standard priority path that may be used for requests that may be non-urgent or where analysis may be performed at a later time. In at least one embodiment, application orchestration system 1028 may distribute resources (e.g., services 920 and/or hardware 922) based on priority paths for different inferencing tasks of AI services 1018.

In at least one embodiment, shared storage may be mounted to AI services 1018 within system 1000. In at least one embodiment, shared storage may operate as a cache (or other storage device type) and may be used to process inference requests from applications. In at least one embodiment, when an inference request is submitted, a request may be received by a set of API instances of deployment system 906, and one or more instances may be selected (e.g., for best fit, for load balancing, etc.) to process a request. In at least one embodiment, to process a request, a request may be entered into a database, a machine learning model may be located from model registry 924 if not already in a cache, a validation step may ensure appropriate machine learning model is loaded into a cache (e.g., shared storage), and/or a copy of a model may be saved to a cache. In at least one embodiment, a scheduler (e.g., of pipeline manager 1012) may be used to launch an application that is referenced in a request if an application is not already running or if there are not enough instances of an application. In at least one embodiment, if an inference server is not already launched to execute a model, an inference server may be launched. In at least one embodiment, any appropriate number of inference servers may be launched per model. In at least one embodiment, in a pull model, in which inference servers are clustered, models may be cached whenever load balancing is advantageous. In at least one embodiment, inference servers may be statically loaded in corresponding, distributed servers.

In at least one embodiment, inferencing may be performed using an inference server that runs in a container. In at least one embodiment, an instance of an inference server may be associated with a model (and optionally a plurality of versions of a model). In at least one embodiment, if an instance of an inference server does not exist when a request to perform inference on a model is received, a new instance may be loaded. In at least one embodiment, when starting an inference server, a model may be passed to an inference server such that a same container may be used to serve different models so long as inference server is running as a different instance.

In at least one embodiment, during application execution, an inference request for a given application may be received, and a container (e.g., hosting an instance of an inference server) may be loaded (if not already), and a start procedure may be called. In at least one embodiment, pre-processing logic in a container may load, decode, and/or perform any appropriate additional pre-processing on incoming data (e.g., using a CPU(s) and/or GPU(s)). In at least one embodiment, once data is prepared for inference, a container may perform inference as necessary on data. In at least one embodiment, this may include a single inference call on one image (e.g., a hand X-ray), or may require inference on hundreds of images (e.g., a chest CT). In at least one embodiment, an application may summarize results before completing, which may include, without limitation, a single confidence score, pixel level-segmentation, voxel-level segmentation, generating a visualization, or generating text to summarize findings. In at least one embodiment, different models or applications may be assigned different priorities. For example, some models may have a real-time (TAT less than one minute) priority while others may have lower priority (e.g., TAT less than 10 minutes). In at least one embodiment, model execution times may be measured from requesting institution or entity and may include partner network traversal time, as well as execution on an inference service.

In at least one embodiment, transfer of requests between services 920 and inference applications may be hidden behind a software development kit (SDK), and robust transport may be provide through a queue. In at least one embodiment, a request will be placed in a queue via an API for an individual application/tenant ID combination and an SDK will pull a request from a queue and give a request to an application. In at least one embodiment, a name of a queue may be provided in an environment from where an SDK will pick it up. In at least one embodiment, asynchronous communication through a queue may be useful as it may allow any appropriate instance of an application to pick up work as it becomes available. In at least one embodiment, results may be transferred back through a queue, to ensure no data is lost. In at least one embodiment, queues may also provide an ability to segment work, as highest priority work may go to a queue with most instances of an application connected to it, while lowest priority work may go to a queue with a single instance connected to it that processes tasks in an order received. In at least one embodiment, an application may run on a GPU-accelerated instance generated in cloud 1026, and an inference service may perform inferencing on a GPU.

In at least one embodiment, visualization services 1020 may be leveraged to generate visualizations for viewing outputs of applications and/or deployment pipeline(s) 1010. In at least one embodiment, GPUs 1022 may be leveraged by visualization services 1020 to generate visualizations. In at least one embodiment, rendering effects, such as ray-tracing, may be implemented by visualization services 1020 to generate higher quality visualizations. In at least one embodiment, visualizations may include, without limitation, 2D image renderings, 3D volume renderings, 3D volume reconstruction, 2D tomographic slices, virtual reality displays, augmented reality displays, etc. In at least one embodiment, virtualized environments may be used to generate a virtual interactive display or environment (e.g., a virtual environment) for interaction by users of a system (e.g., doctors, nurses, radiologists, etc.). In at least one embodiment, visualization services 1020 may include an internal visualizer, cinematics, and/or other rendering or image processing capabilities or functionality (e.g., ray tracing, rasterization, internal optics, etc.).

In at least one embodiment, hardware 922 may include GPUs 1022, AI system 1024, cloud 1026, and/or any other appropriate hardware used for executing training system 904 and/or deployment system 906. In at least one embodiment, GPUs 1022 (e.g., NVIDIA's TESLA and/or QUADRO GPUs) may include any appropriate number of GPUs that may be used for executing processing tasks of compute services 1016, AI services 1018, visualization services 1020, other services, and/or any of features or functionality of software 918. For example, with respect to AI services 1018, GPUs 1022 may be used to perform pre-processing on imaging data (or other data types used by machine learning models), post-processing on outputs of machine learning models, and/or to perform inferencing (e.g., to execute machine learning models). In at least one embodiment, cloud 1026, AI system 1024, and/or other components of system 1000 may use GPUs 1022. In at least one embodiment, cloud 1026 may include a GPU-optimized platform for deep learning tasks. In at least one embodiment, AI system 1024 may use GPUs, and cloud 1026—or at least a portion tasked with deep learning or inferencing—may be executed using one or more AI systems 1024. As such, although hardware 922 is illustrated as discrete components, this is not intended to be limiting, and any appropriate components of hardware 922 may be combined with, or leveraged by, any other components of hardware 922.

In at least one embodiment, AI system 1024 may include a purpose-built computing system (e.g., a super-computer or an HPC) configured for inferencing, deep learning, machine learning, and/or other artificial intelligence tasks. In at least one embodiment, AI system 1024 (e.g., NVIDIA's DGX) may include GPU-optimized software (e.g., a software stack) that may be executed using a plurality of GPUs 1022, in addition to CPUs, RAM, storage, and/or other components, features, or functionality. In at least one embodiment, one or more AI systems 1024 may be implemented in cloud 1026 (e.g., in a data center) for performing some or all of AI-based processing tasks of system 1000.

In at least one embodiment, cloud 1026 may include a GPU-accelerated infrastructure (e.g., NVIDIA's NGC) that may provide a GPU-optimized platform for executing processing tasks of system 1000. In at least one embodiment, cloud 1026 may include an AI system(s) 1024 for performing one or more of AI-based tasks of system 1000 (e.g., as a hardware abstraction and scaling platform). In at least one embodiment, cloud 1026 may integrate with application orchestration system 1028 leveraging multiple GPUs to enable seamless scaling and load balancing between and among applications and services 920. In at least one embodiment, cloud 1026 may tasked with executing at least some of services 920 of system 1000, including compute services 1016, AI services 1018, and/or visualization services 1020, as described herein. In at least one embodiment, cloud 1026 may perform small and large batch inference (e.g., executing NVIDIA's TENSOR RT), provide an accelerated parallel computing API and platform 1030 (e.g., NVIDIA's CUDA), execute application orchestration system 1028 (e.g., KUBERNETES), provide a graphics rendering API and platform (e.g., for ray-tracing, 2D graphics, 3D graphics, and/or other rendering techniques to produce higher quality cinematics), and/or may provide other functionality for system 1000.

In at least one embodiment, in an effort to preserve patient confidentiality (e.g., where patient data or records are to be used off-premises), cloud 1026 may include a registry—such as a deep learning container registry. In at least one embodiment, a registry may store containers for instantiations of applications that may perform pre-processing, post-processing, or other processing tasks on patient data. In at least one embodiment, cloud 1026 may receive data that includes patient data as well as sensor data in containers, perform requested processing for just sensor data in those containers, and then forward a resultant output and/or visualizations to appropriate parties and/or devices (e.g., on-premises medical devices used for visualization or diagnoses), all without having to extract, store, or otherwise access patient data. In at least one embodiment, confidentiality of patient data is preserved in compliance with HIPAA and/or other data regulations.

Data Center

Figure 11:
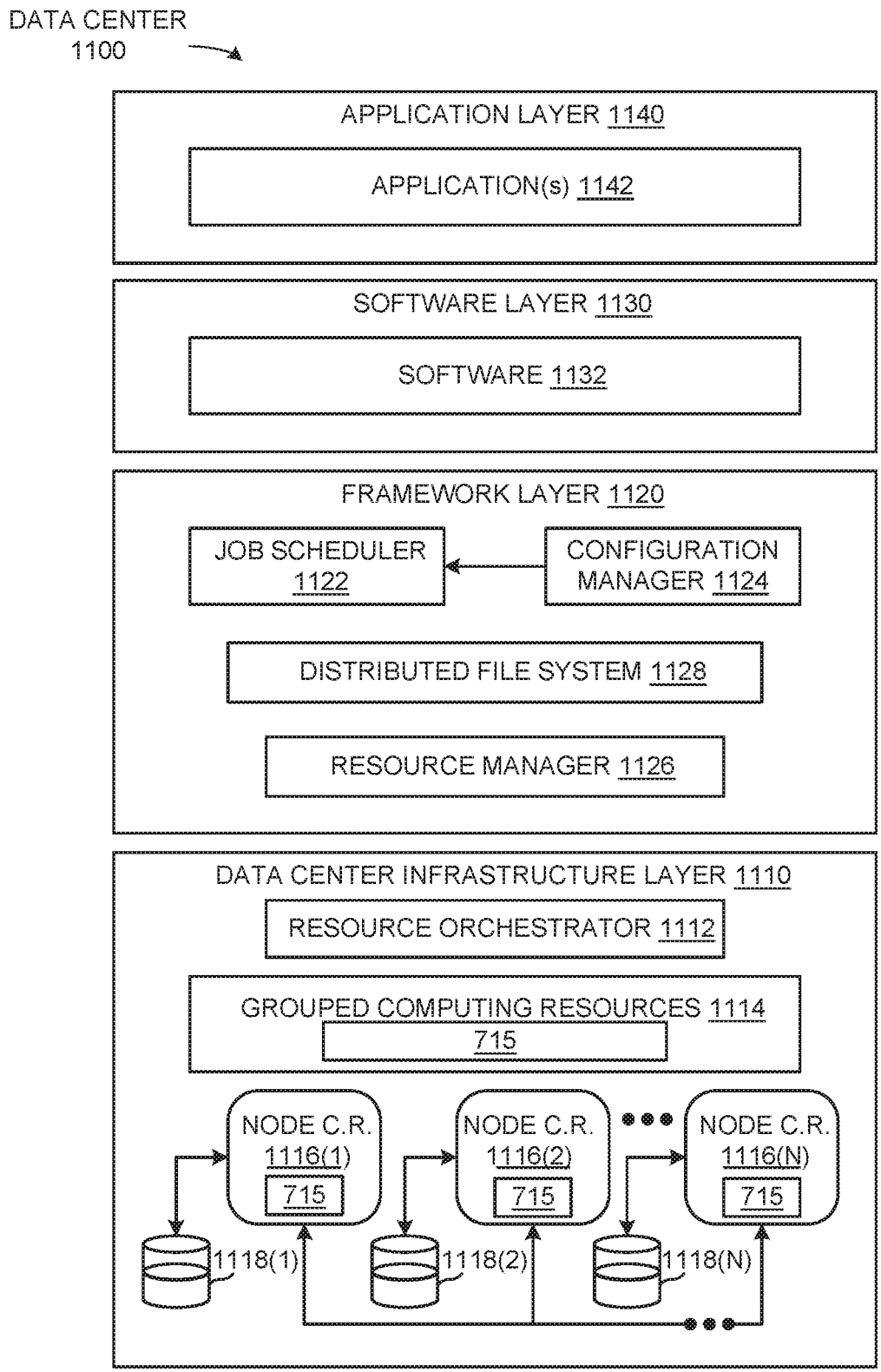
FIG. 11 illustrates an example data center system, according to at least one embodiment.

FIG. 11 illustrates an example data center 1100, in which at least one embodiment may be used. In at least one embodiment, data center 1100 includes a data center infrastructure layer 1110, a framework layer 1120, a software layer 1130 and an application layer 1140.

In at least one embodiment, as shown in FIG. 11, data center infrastructure layer 1110 may include a resource orchestrator 1112, grouped computing resources 1114, and node computing resources ("node C.R.s") 1116(1)-1116(N), where "N" represents a positive integer (which may be a different integer "N" than used in other figures). In at least one embodiment, node C.R.s 1116(1)-1116(N) may include, but are not limited to, any appropriate number of central processing units ("CPUs") or other processors (including accelerators, field programmable gate arrays (FPGAs), graphics processors, etc.), memory storage devices 1118(1)-1118(N) (e.g., dynamic read-only memory, solid state storage or disk drives), network input/output ("NW I/O") devices, network switches, virtual machines ("VMs"), power modules, and cooling modules, etc. In at least one embodiment, one or more node C.R.s from among node C.R.s 1116(1)-1116(N) may be a server having one or more of above-mentioned computing resources.

In at least one embodiment, grouped computing resources 1114 may include separate groupings of node C.R.s housed within one or more racks (not shown), or many racks housed in data centers at various geographical locations (also not shown). In at least one embodiment, separate groupings of node C.R.s within grouped computing resources 1114 may include grouped compute, network, memory or storage resources that may be configured or allocated to support one or more workloads. In at least one embodiment, several node C.R.s including CPUs or processors may grouped within one or more racks to provide compute resources to support one or more workloads. In at least one embodiment, one or more racks may also include any appropriate number of power modules, cooling modules, and network switches, in any appropriate combination.

In at least one embodiment, resource orchestrator 1112 may configure or otherwise control one or more node C.R.s 1116(1)-1116(N) and/or grouped computing resources 1114. In at least one embodiment, resource orchestrator 1112 may include a software design infrastructure ("SDI") management entity for data center 1100. In at least one embodiment, resource orchestrator 1112 may include hardware, software or some combination thereof.

In at least one embodiment, as shown in FIG. 11, framework layer 1120 includes a job scheduler 1122, a configuration manager 1124, a resource manager 1126 and a distributed file system 1128. In at least one embodiment, framework layer 1120 may include a framework to support software 1132 of software layer 1130 and/or one or more application(s) 1142 of application layer 1140. In at least one embodiment, software 1132 or application(s) 1142 may respectively include web-based service software or applications, such as those provided by Amazon Web Services, Google Cloud and Microsoft Azure. In at least one embodiment, framework layer 1120 may be, but is not limited to, a type of free and open-source software web application framework such as Apache Spark™ (hereinafter "Spark") that may utilize distributed file system 1128 for large-scale data processing (e.g., "big data"). In at least one embodiment, job scheduler 1122 may include a Spark driver to facilitate scheduling of workloads supported by various layers of data center 1100. In at least one embodiment, configuration manager 1124 may be capable of configuring different layers such as software layer 1130 and framework layer 1120 including Spark and distributed file system 1128 for supporting large-scale data processing. In at least one embodiment, resource manager 1126 may be capable of managing clustered or grouped computing resources mapped to or allocated for support of distributed file system 1128 and job scheduler 1122. In at least one embodiment, clustered or grouped computing resources may include grouped computing resources 1114 at data center infrastructure layer 1110. In at least one embodiment, resource manager 1126 may coordinate with resource orchestrator 1112 to manage these mapped or allocated computing resources.

In at least one embodiment, software 1132 included in software layer 1130 may include software used by at least portions of node C.R.s 1116(1)-1116(N), grouped computing resources 1114, and/or distributed file system 1128 of framework layer 1120. In at least one embodiment, one or more types of software may include, but are not limited to, Internet web page search software, e-mail virus scan software, database software, and streaming video content software.

In at least one embodiment, application(s) 1142 included in application layer 1140 may include one or more types of applications used by at least portions of node C.R.s 1116(1)-1116(N), grouped computing resources 1114, and/or distributed file system 1128 of framework layer 1120. In at least one embodiment, one or more types of applications may include, but are not limited to, any appropriate number of a genomics application, a cognitive compute, application and a machine learning application, including training or inferencing software, machine learning framework software (e.g., PyTorch, TensorFlow, Caffe, etc.) or other machine learning applications used in conjunction with one or more embodiments.

In at least one embodiment, any appropriate of configuration manager 1124, resource manager 1126, and resource orchestrator 1112 may implement any appropriate number and type of self-modifying actions based on any appropriate amount and type of data acquired in any appropriate technically feasible fashion. In at least one embodiment, self-modifying actions may relieve a data center operator of data center 1100 from making possibly bad configuration decisions and possibly avoiding underutilized and/or poor performing portions of a data center.

In at least one embodiment, data center 1100 may include tools, services, software or other resources to train one or more machine learning models or predict or infer information using one or more machine learning models according to one or more embodiments described herein. For example, in at least one embodiment, a machine learning model may be trained by calculating weight parameters according to a neural network architecture using software and computing resources described above with respect to data center 1100. In at least one embodiment, trained machine learning models corresponding to one or more neural networks may be used to infer or predict information using resources described above with respect to data center 1100 by using weight parameters calculated through one or more training techniques described herein.

In at least one embodiment, data center may use CPUs, application-specific integrated circuits (ASICs), GPUs, FPGAs, or other hardware to perform training and/or inferencing using above-described resources. Moreover, one or more software and/or hardware resources described above may be configured as a service to allow users to train or performing inferencing of information, such as image recognition, speech recognition, or other artificial intelligence services.

Inference and/or training logic 715 are used to perform inferencing and/or training operations associated with one or more embodiments. Details regarding inference and/or training logic 715 are provided herein in conjunction with FIGS. 7A and/or 7B. In at least one embodiment, inference and/or training logic 715 may be used in system FIG. 11 for inferencing or predicting operations based, at least in part, on weight parameters calculated using neural network training operations, neural network functions and/or architectures, or neural network use cases described herein.

At least one embodiment of the disclosure can be described in view of the following clauses:

In clause 1, a method comprising: (i) identifying, by a processing device, an input value into a cryptographic operation and a cryptographic key associated with the cryptographic operation; (ii) computing, based on the input value and the cryptographic key, a common value for a plurality of stages of the cryptographic operation; (iii) processing in parallel a plurality of stage inputs through the plurality of stages, each stage input being processed by a respective stage, wherein the plurality of stage inputs are derived from the common value; (iv) selecting an active stage from the plurality of stages; (v) repeating (iii) through (iv) using an output of a preceding active stage as the common value until each of the plurality of stages has been selected as the active stage; and obtaining an output value of the cryptographic operation using an output of a last active stage.

In clause 2, the method of clause 1, wherein each of the plurality of stage inputs is processed concurrently with processing of other stage inputs.

In clause 3, the method of clause 1, wherein stage inputs into at least two of the plurality of stages are the same.

In clause 4, the method of clause 1, wherein computing, based on the input value and the cryptographic key, the common value comprises computing two or more shares of the common value, wherein an input into a first share of the two or more shares comprises: a first random number, and a second random number, and wherein an input into a second share of the two or more shares comprises: the input value into the cryptographic operation, the cryptographic key, the first random number, and the second random number.

In clause 5, the method of clause 4, wherein computing, based on the input value and the cryptographic key, the common value comprises: at a first clock cycle, responsive to determining that an input selector has a first value, storing dummy data in: a first state register for the first share, a second state register for the second share, a first key register for the first share, and a second key register for the second share; and at a second clock cycle, overwriting: the first state register with the first random number, the first key register with the second random number, the second state register with a first number that is based on (i) the input value into the cryptographic operation and (ii) the first random number, and the second key register with a second number that is based on the cryptographic key and the second random number.

In clause 6, the method of clause 4, wherein computing, based on the input value and the cryptographic key, the common value comprises: at a first clock cycle, responsive to determining that an input selector has a second value, storing: in a first state register for the first share, the first random number, in a first key register for the first share, the second random number, in a second state register for the second share, a first number that is based on (i) the input value into the cryptographic operation and (ii) the first random number, and in a second key register for the second share a second number that is based on the cryptographic key and the second random number; and at a second clock cycle, storing dummy data in a first portion of a stage status register and in a second portion of the stage status register.

In clause 7, the method of clause 1, wherein the common value, computed based on the input value and the cryptographic key, comprises a first portion and a second portion, wherein the first portion comprises an output of a linear mapping stage of an advanced encryption standard (AES) cryptographic algorithm and the second portion comprises random bits.

In clause 8, the method of clause 1, wherein the common value, computed based on the input value and the cryptographic key, is stored in a stage status register, and wherein during repeating of (iii) through (iv) the common value is stored in the same stage status register.

In clause 9, the method of clause 1, wherein each stage of the plurality of stages performs a portion of a substitution box of an AES cryptographic algorithm.

In clause 10, a system comprising: a plurality of registers; one or more first circuits to store, in the plurality of registers, a first representation of an input data into a cryptographic operation, and a dummy data, wherein the first representation of the input data and the dummy data are stored in an order that is determined based on one or more random input selector values; and one or more second circuits to perform a non-linear mapping of the first representation of the input data to a second representation of the input data.

In clause 11, the system of clause 10, wherein the input data into the cryptographic operation comprises a plaintext message and a cryptographic key associated with the cryptographic operation, and wherein the first representation of the input data comprises a first share of the plaintext message and a second share of the plaintext message, wherein the first share of the plaintext message comprises a random number.

In clause 12, the system of clause 10, wherein the plurality of registers comprise one or more input registers to store the first representation of the input data and a stage status register, and wherein the one or more first circuits are further to: at a first clock cycle, responsive to determining that the one or more random input selector values comprise a first value, storing the dummy data in the plurality of registers; and at a second clock cycle, overwrite the dummy data in the plurality of registers with the first representation of the input data into the cryptographic operation.

In clause 13, the system of clause 10, wherein the non-linear mapping of the first representation of the input data to the second representation of the input data comprises a substitution box of an advanced encryption standard (AES) cryptographic algorithm.

In clause 14, a system comprising: one or more circuits to execute a substitution box (S-Box) of an advanced encryption standard (AES) cryptographic algorithm using multiple iterations, wherein each iteration includes two or more stages of the S-Box operating in parallel, one of the stages computing real data and other stages computing dummy data.

In clause 15, the system of clause 14, a system comprising: a plurality of registers; and a processing device communicatively coupled to the plurality of registers, the processing device to: (i) identify an input value into a cryptographic operation and a cryptographic key associated with the cryptographic operation: (ii) compute, based on the input value and the cryptographic key, a common value for a plurality of stages of the cryptographic operation; (iii) process in parallel a plurality of stage inputs through the plurality of stages, each stage input being processed by a respective stage, wherein the plurality of stage inputs are derived from the common value: (iv) select an active stage from the plurality of stages; (v) repeat (iii) through (iv) using an output of a preceding active stage as the common value until each of the plurality of stages has been selected as the active stage; and obtain an output value of the cryptographic operation using an output of a last active stage.

In clause 16, the system of clause 15, wherein each of the plurality of stage inputs is processed concurrently with processing of other stage inputs.

In clause 17, the system of clause 15, wherein stage inputs into at least two of the plurality of stages are the same.

In clause 18, the system of clause 15, wherein to compute, based on the input value and the cryptographic key, the common value, the processing device is to compute two or more shares of common value, wherein an input into a first share of the two or more shares comprises: a first random number, and a second random number, and wherein an input into a second share of the two or more shares comprises: the input value into the cryptographic operation, the cryptographic key, the first random number, and the second random number.

In clause 19, the system of clause 18, wherein to compute, based on the input value and the cryptographic key, the common value, the processing device is to: at a first clock cycle, responsive to determining that an input selector has a first value, storing dummy data in: a first state register for the first share, a second state register for the second share, a first key register for the first share, and a second key register for the second share; and at a second clock cycle, overwriting: the first state register with the first random number, the first key register with the second random number, the second state register with a first number that is based on (i) the input value into the cryptographic operation and (ii) the first random number, and the second key register with a second number that is based on the cryptographic key and the second random number.

In clause 20, the system of clause 18, wherein to compute, based on the input value and the cryptographic key, the common value, the processing device is to: at a first clock cycle, responsive to determining that an input selector has a second value, storing: in a first state register for the first share, the first random number, in a first key register for the first share, the second random number, in a second state register for the second share, a first number that is based on (i) the input value into the cryptographic operation and (ii) the first random number, and in a second key register for the second share, a second number that is based on the cryptographic key and the second random number; and at a second clock cycle, storing dummy data in a first portion of a stage status register and in a second portion of the stage status register.

In clause 21, the system of clause 15, wherein the common value, computed based on the input value and the cryptographic key, comprises a first portion and a second portion, wherein the first portion comprises an output of a linear mapping stage of an advanced encryption standard (AES) cryptographic algorithm and the second portion comprises random bits.

In clause 22, the system of clause 15, wherein the common value, computed based on the input value and the cryptographic key, is stored in a stage status register, and wherein during repeating of (iii) through (iv) the common value is stored in the same stage status register.

In clause 23, the system of clause 15, wherein each stage of the plurality of stages performs a portion of a substitution box of an AES cryptographic algorithm.

In clause 24, anon-transitory computer-readable medium storing instructions thereon, wherein the instructions, when executed by a processing device, cause the processing device to: (i) identify an input value into a cryptographic operation and a cryptographic key associated with the cryptographic operation; (ii) compute, based on the input value and the cryptographic key, a common value for a plurality of stages of the cryptographic operation; (iii) process in parallel a plurality of stage inputs through the plurality of stages, each stage input being processed by a respective stage, wherein the plurality of stage inputs are derived from the common value; (iv) select an active stage from the plurality of stages; (v) repeat (iii) through (iv) using an output of a preceding active stage as the common value until each of the plurality of stages has been selected as the active stage; and obtain an output value of the cryptographic operation using an output of a last active stage.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected." when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. In at least one embodiment, use of term "set" (e.g., "a set of items") or "subset" unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C." or "at least one of A, B and C." unless specifically stated otherwise or otherwise clearly contradicted by context, is otherwise understood with context as used in general to present that an item, term, etc., may be either A or B or C, or any appropriate nonempty subset of set of A and B and C. For instance, in illustrative example of a set having three members, conjunctive phrases "at least one of A, B, and C" and "at least one of A, B and C" refer to any appropriate of following sets. {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, term "plurality" indicates a state of being plural (e.g., "a plurality of items" indicates multiple items). In at least one embodiment, number of items in a plurality is at least two, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. In at least one embodiment, set of non-transitory computer-readable storage media comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors—for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any appropriate device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one embodiment, terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. In at least one embodiment, process of obtaining, acquiring, receiving, or inputting analog and digital data can be accomplished in a variety of ways such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or interprocess communication mechanism.

Although descriptions herein set forth example embodiments of described techniques, other architectures may be used to implement described functionality, and are intended to be within scope of this disclosure. Furthermore, although specific distributions of responsibilities may be defined above for purposes of description, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A method comprising:
   (i) identifying, by a processing device, an input value into a cryptographic operation and a cryptographic key associated with the cryptographic operation, wherein the cryptographic operation comprises a plurality of stages;
   (ii) computing, based on the input value and the cryptographic key, a common value associated with an output of a previously active stage of the plurality of stages of the cryptographic operation;
   (iii) processing, in parallel, a plurality of stage inputs through the plurality of stages, each stage input being processed by a respective stage, wherein the plurality of stage inputs are derived from the common value;
   (iv) selecting an active stage of the plurality of stages;
   (v) repeating (iii) through (iv) until each of the plurality of stages has been selected as the active stage; and
   (vi) obtaining an output value of the cryptographic operation using an output of a last active stage of the plurality of stages.

2. The method of claim 1, wherein each of the plurality of stage inputs is processed concurrently with processing of other stage inputs.

3. The method of claim 1, wherein stage inputs into at least two of the plurality of stages are the same.

4. The method of claim 1, wherein computing, based on the input value and the cryptographic key, the common value comprises computing two or more shares of the common value, wherein an input into a first share of the two or more shares comprises:
   a first random number, and
   a second random number, and
   wherein an input into a second share of the two or more shares comprises:
   the input value into the cryptographic operation,
   the cryptographic key,
   the first random number, and
   the second random number.

5. The method of claim 4, wherein computing, based on the input value and the cryptographic key, the common value comprises:
   at a first clock cycle, responsive to determining that an input selector has a first value, storing dummy data in:
      a first state register for the first share,
      a second state register for the second share,
      a first key register for the first share, and
      a second key register for the second share; and
   at a second clock cycle, overwriting:
      the first state register with the first random number,
      the first key register with the second random number,
      the second state register with a first number that is based on (i) the input value into the cryptographic operation and (ii) the first random number, and
      the second key register with a second number that is based on the cryptographic key and the second random number.

6. The method of claim 4, wherein computing, based on the input value and the cryptographic key, the common value comprises:
   at a first clock cycle, responsive to determining that an input selector has a second value, storing:
      in a first state register for the first share, the first random number,
      in a first key register for the first share, the second random number,
      in a second state register for the second share, a first number that is based on (i) the input value into the cryptographic operation and (ii) the first random number, and
      in a second key register for the second share a second number that is based on the cryptographic key and the second random number; and
   at a second clock cycle, storing dummy data in on or more stage status registers.

7. The method of claim 1, wherein the common value, computed based on the input value and the cryptographic key, comprises a first portion and a second portion, wherein the first portion comprises an output of a linear mapping stage of an advanced encryption standard (AES) cryptographic algorithm and the second portion comprises random bits.

8. The method of claim 1, wherein the common value, computed based on the input value and the cryptographic key, is stored in a stage status register, and wherein during repeating of (iii) through (iv) the common value is stored in the same stage status register.

9. The method of claim 1, wherein each stage of the plurality of stages performs a portion of a substitution box of an AES cryptographic algorithm.

10. A system comprising:
    a plurality of registers; and
    a processing device communicatively coupled to the plurality of registers, the processing device to:
    (i) identify an input value into a cryptographic operation and a cryptographic key associated with the cryptographic operation, wherein the cryptographic operation comprises a plurality of stages;
    (ii) compute, based on the input value and the cryptographic key, a common value associated with an output of a previously active stage of the plurality of stages of the cryptographic operation;
    (iii) process in parallel a plurality of stage inputs through the plurality of stages, each stage input being processed by a respective stage, wherein the plurality of stage inputs are derived from the common value;
    (iv) select an active stage of the plurality of stages;
    (v) repeat (iii) through (iv) until each of the plurality of stages has been selected as the active stage; and
    (vi) obtain an output value of the cryptographic operation using an output of a last active stage of the plurality of stages.

11. The system of claim 10, wherein each of the plurality of stage inputs is processed concurrently with processing of other stage inputs.

12. The system of claim 10, wherein stage inputs into at least two of the plurality of stages are the same.

13. The system of claim 10, wherein to compute, based on the input value and the cryptographic key, the common value, the processing device is to compute two or more shares of common value, wherein an input into a first share of the two or more shares comprises:
- a first random number, and
- second random number, and wherein an input into a second share of the two or more shares comprises:
- the input value into the cryptographic operation,
- the cryptographic key,
- the first random number, and
- the second random number.

14. The system of claim 13, wherein to compute, based on the input value and the cryptographic key, the common value, the processing device is to:
at a first clock cycle, responsive to determining that an input selector has a first value, storing dummy data in:
- a first state register for the first share,
- a second state register for the second share,
- a first key register for the first share, and
- a second key register for the second share; and at a second clock cycle, overwriting:
- the first state register with the first random number,
- the first key register with the second random number,
- the second state register with a first number that is based on (i) the input value into the cryptographic operation and (ii) the first random number, and
- the second key register with a second number that is based on the cryptographic key and the second random number.

15. The system of claim 13, wherein to compute, based on the input value and the cryptographic key, the common value, the processing device is to:
at a first clock cycle, responsive to determining that an input selector has a second value, storing:
- in a first state register for the first share, the first random number,
- in a first key register for the first share, the second random number,
- in a second state register for the second share, a first number that is based on (i) the input value into the cryptographic operation and (ii) the first random number, and
- in a second key register for the second share, a second number that is based on the cryptographic key and the second random number; and
- at a second clock cycle, storing dummy data in one or more stage status registers.

16. The system of claim 10, wherein the common value, computed based on the input value and the cryptographic key, comprises a first portion and a second portion, wherein the first portion comprises an output of a linear mapping stage of an advanced encryption standard (AES) cryptographic algorithm and the second portion comprises random bits.

17. The system of claim 10, wherein the common value, computed based on the input value and the cryptographic key, is stored in a stage status register, and wherein during repeating of (iii) through (iv) the common value is stored in the same stage status register.

18. The system of claim 10, wherein each stage of the plurality of stages performs a portion of a substitution box of an AES cryptographic algorithm.

19. A non-transitory computer-readable medium storing instructions thereon, wherein the instructions, when executed by a processing device, cause the processing device to:
(i) identify an input value into a cryptographic operation and a cryptographic key associated with the cryptographic operation, wherein the cryptographic operation comprises a plurality of stages;
(ii) compute, based on the input value and the cryptographic key, a common value associated with an output of a previously active stage of the plurality of stages of the cryptographic operation;
(iii) process in parallel a plurality of stage inputs through the plurality of stages, each stage input being processed by a respective stage, wherein the plurality of stage inputs are derived from the common value;
(iv) select an active stage of the plurality of stages;
(v) repeat (iii) through (iv) until each of the plurality of stages has been selected as the active stage; and
obtain an output value of the cryptographic operation using an output of a last active stage of the plurality of stages.

* * * * *